US012444133B2

(12) United States Patent
Chen et al.

(10) Patent No.: US 12,444,133 B2
(45) Date of Patent: Oct. 14, 2025

(54) METHOD FOR AUTONOMOUSLY SCANNING AND CONSTRUCTING A REPRESENTATION OF A STAND OF TREES

(71) Applicant: Treeswift Inc., Philadelphia, PA (US)

(72) Inventors: Steven Chen, Philadelphia, PA (US); Elizabeth Hunter, Philadelphia, PA (US); Michael Shomin, Philadelphia, PA (US)

(73) Assignee: Treeswift Inc., Philadelphia, PA (US)

( * ) Notice: Subject to any disclaimer, the term of this patent is extended or adjusted under 35 U.S.C. 154(b) by 333 days.

(21) Appl. No.: 18/199,863

(22) Filed: May 19, 2023

(65) Prior Publication Data

US 2023/0386132 A1 Nov. 30, 2023

Related U.S. Application Data

(60) Provisional application No. 63/343,979, filed on May 19, 2022.

(51) Int. Cl.

| | |
|---|---|
| *G06T 17/05* | (2011.01) |
| *G06T 7/11* | (2017.01) |
| *G06T 7/13* | (2017.01) |
| *G06T 7/60* | (2017.01) |
| *G06T 7/62* | (2017.01) |
| *G06V 10/25* | (2022.01) |
| *G06V 10/44* | (2022.01) |
| *G06V 10/80* | (2022.01) |

(Continued)

(52) U.S. Cl.
CPC ............ *G06T 17/05* (2013.01); *G06T 7/11* (2017.01); *G06T 7/13* (2017.01); *G06T 7/60* (2013.01); *G06T 7/62* (2017.01); *G06V 10/25* (2022.01); *G06V 10/44* (2022.01); *G06V 10/806* (2022.01); *G06V 20/17* (2022.01); *G06V 20/188* (2022.01); *G06T 2207/10016* (2013.01); *G06T 2207/10032* (2013.01); *G06T 2207/30188* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 9,984,455 B1 * | 5/2018 | Fox | B64C 31/024 |
| 2020/0019777 A1 * | 1/2020 | Gurzoni, Jr. | G06V 10/803 |

(Continued)

*Primary Examiner* — Edward Martello
(74) *Attorney, Agent, or Firm* — Run8 Patent Group, LLC; Peter Miller

(57) ABSTRACT

One variation of a method includes: accessing a boundary of a stand of trees; defining an array of scan zones within the boundary; accessing a first sequence of images representing treetops in a first scan zone; accessing a second sequence of images representing bases of trees in the first scan zone; accessing a third sequence of images representing bases of trees in a second scan zone; accessing a fourth sequence of images representing treetops in the second scan zone; interpolating canopy characteristics of trees between the first scan zone and the second scan zone based on the first and fourth sequences of images; interpolating lower tree characteristics of trees between the first scan zone and the second scan zone based on the second and third sequences of images; and compiling canopy and lower tree characteristics into a virtual representation of tree characteristics across the stand of trees.

20 Claims, 5 Drawing Sheets

(51) Int. Cl.
*G06V 20/10* (2022.01)
*G06V 20/17* (2022.01)

(56) References Cited

U.S. PATENT DOCUMENTS

2021/0232818 A1* 7/2021 Saxena .................. G06V 20/52
2022/0044475 A1* 2/2022 Tham ..................... G01C 11/06

* cited by examiner

METHOD FOR AUTONOMOUSLY SCANNING AND CONSTRUCTING A REPRESENTATION OF A STAND OF TREES

CROSS-REFERENCE TO RELATED APPLICATIONS

This application claims the benefit of U.S. Provisional Application No. 63/343,979, filed on 19 May 2022, which is incorporated in its entirety by this reference.

TECHNICAL FIELD

This invention relates generally to the field of forestry and more specifically to a new and useful method for measuring tree population and health in the field of forestry.

DESCRIPTION OF THE EMBODIMENTS

Figure 1A:
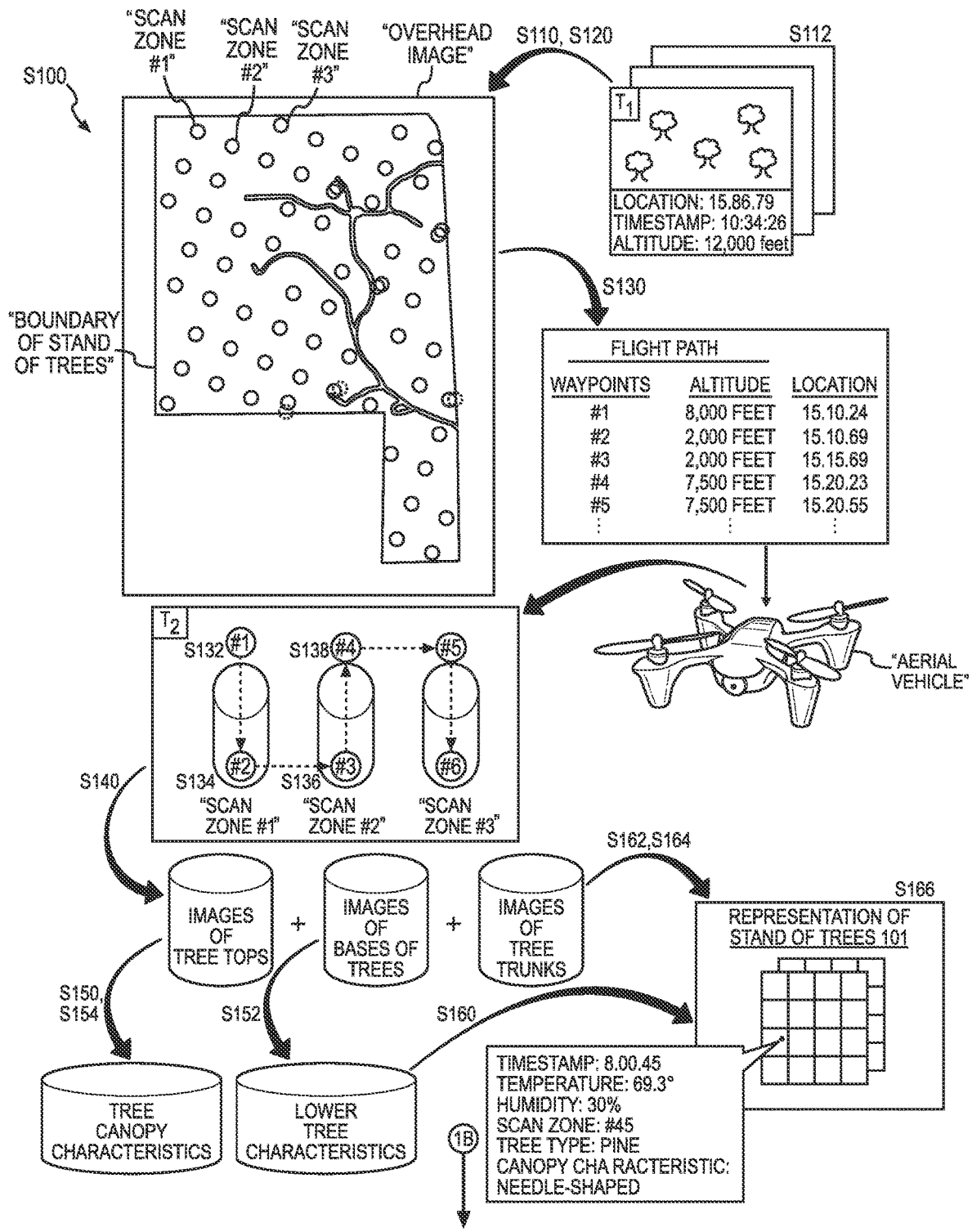
FIGS. 1A and 1B are flowchart representations of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1A, 1B, 2A, 2B, 3A, and 3B, a method S100 for autonomously scanning and constructing a representation of a stand of trees includes: accessing a boundary of a stand of trees in Block S110; and defining an array of scan zones within the boundary of the stand of trees in Block S120. The method S100 further includes, defining a flight path in Block S130 including: a first waypoint at a first altitude above a first set of trees within a first scan zone; a second waypoint at a second altitude proximal a first floor within the first scan zone; a third waypoint at a third altitude proximal a second floor within a second scan zone; a fourth waypoint at a fourth altitude above a second set of trees within the second scan zone; and a fifth waypoint at a fifth altitude above a third set of trees within a third scan zone.

The method S100 also includes, accessing a first set of images in Block S140 including: a first sequence of images representing tops of the first set of trees and captured by an aerial vehicle proximal the first waypoint; a second sequence of images representing bases of the first set of trees and captured by the aerial vehicle proximal the second waypoint; a third sequence of images representing bases of the second set of trees and captured by the aerial vehicle proximal the third waypoint; a fourth sequence of images representing tops of the second set of trees and captured by the aerial vehicle proximal the fourth waypoint; and a fifth sequence of images representing tops of the third set of trees and captured by the aerial vehicle proximal the fifth waypoint.

The method S100 further includes: interpolating a first set of tree canopy characteristics of a fourth set of trees between the first scan zone and the second scan zone based on visual features detected in the first sequence of images and the fourth sequence of images in Block S150; interpolating a first set of lower tree characteristics of the fourth set of trees between the first scan zone and the second scan zone based on visual features detected in the second sequence of images and the third sequence of images in Block S152; interpolating a second set of tree canopy characteristics of a fifth set of trees between the second scan zone and the third scan zone based on visual features detected in the fourth sequence of images and the fifth sequence of images in Block S154; and compiling the first set of tree canopy characteristics, the first set of lower tree characteristics, and the second set of tree canopy characteristics into a virtual representation of tree characteristics across the stand of trees in Block S160

1.1 Variation: Aerial Vehicle Traversal+Three-Dimensional Representation

One variation of the method S100 includes: accessing an overhead image depicting a stand of trees in Block S112; overlaying a boundary of the stand of trees onto the overhead image in Block S110; projecting an array of scan zones onto the overhead image within the boundary of the stand of trees in Block S120; and deploying an aerial vehicle to execute a flight path through the array of scan zones in Block S130. This variation of the method S100 further includes, during the flight path: traversing the aerial vehicle across the stand of trees to a first waypoint above a first scan zone in Block S132; vertically traversing the aerial vehicle to a second waypoint proximal a first floor of the first scan zone in Block S134; laterally traversing the aerial vehicle from the first scan zone to a third waypoint proximal to a second floor of a second scan zone in Block S136; and vertically traversing the aerial vehicle to a fourth waypoint above the second scan zone in Block S138.

This variation of the method S100 also includes accessing a set of images captured by the aerial vehicle in Block S140 including: a first sequence of images representing tops of a first set of trees within the first scan zone; a first intermediate vertical sequence of images representing trunks of the first set of trees; a second sequence of images representing bases of the first set of trees within the first scan zone; a third sequence of images representing bases of a second set of trees within the second scan zone; a second intermediate vertical sequence of images representing trunks of the second set of trees; and a fourth sequence of images representing tops of the second set of trees within the second scan zone.

This variation of the method S100 further includes: compiling the first sequence of images, the first intermediate vertical sequence of images, and the second sequence of images into a first three-dimensional representation of the first scan zone in Block S162; compiling the third sequence of images, the second intermediate vertical sequence of images, and the fourth sequence of images into a second three-dimensional representation of the second scan zone in Block S164; and assembling the first three-dimensional representation of the first scan zone and the second three-dimensional representation of the second scan zone into a third three-dimensional representation of the stand of trees in Block S166.

1.2 Variation: Representation of Tree Characteristics

One variation of the method S100 includes: accessing a boundary of a stand of trees in Block S110; defining an array of scan zones within the boundary of the stand of trees in Block S120; and defining a flight path including a set of waypoints representing positions within the array of scan zones in Block S130.

This variation of the method S100 further includes accessing a set of images captured by the aerial vehicle in Block S140 including: a first sequence of images representing tops of a first set of trees within a first scan zone; a second sequence of images representing bases of the first set of trees within the first scan zone; a third sequence of images representing bases of a second set of trees within a second scan zone; a fourth sequence of images representing tops of the second set of trees; and a fifth sequence of images representing tops of a third set of trees within a third scan zone.

This variation of the method S100 also includes: interpolating a first set of tree canopy characteristics of a fourth set of trees between the first scan zone and the second scan zone based on visual features detected in the first sequence of images and the fourth sequence of images in Block S150; interpolating a first set of lower tree characteristics of the fourth set of trees between the first scan zone and the second scan zone based on visual features detected in the second sequence of images and the third sequence of images in Block S152; interpolating a second set of tree canopy characteristics of a fifth set of trees between the second scan zone and the third scan zone based on visual features detected in the fourth sequence of images and the fifth sequence of images in Block S154; and compiling the first set of tree canopy characteristics, the first set of lower tree characteristics, and the second set of tree canopy characteristics into a virtual representation of tree characteristics across the stand of trees in Block S160.

1.3 Variation: Audit Tool

One variation of the method S100 includes: accessing an overhead image depicting a stand of trees in Block S112; accessing a set of ground images representing bases of the stand of trees and captured by an aerial vehicle in Block S140; and isolating a first set of trees, in the stand of trees, depicted in the set of ground images.

This variation of the method S100 further includes, for each tree in the first set of trees: detecting a first region of the set of ground images depicting the tree in Block S142; extracting a first set of visual features from the first region of the set of ground images in Block S144; characterizing a value of a metric of the tree based on the first set of visual features in Block S146; detecting a second region of the overhead image depicting the tree in Block S142; extracting a second set of visual features from the second region of the overhead image in Block S144; and storing the value of the metric and the second set of visual features in a container in a set of containers in Block S148.

This variation of the method S100 also includes generating a metric function representing a correlation between values of the metric and visual features within the stand of trees in Block S156 and based on the set of containers, isolating a second set of trees, in the stand of trees, excluded from the set of ground images and depicted in the overhead image and, for each tree in the second set of trees: detecting a third region of the overhead image depicting the tree in Block S142; extracting a third set of visual features from the third region of the overhead image in Block S144; and characterizing a second value of the metric of the tree based on the third set of visual features in Block S146. This variation of the method S100 further includes compiling values of the metric, for the first set of trees and the second set of trees, into a composite value of the metric for the stand of trees in Block S170.

1.4 Variation: Confidence Scores+Virtual Representation

Figure 2A:
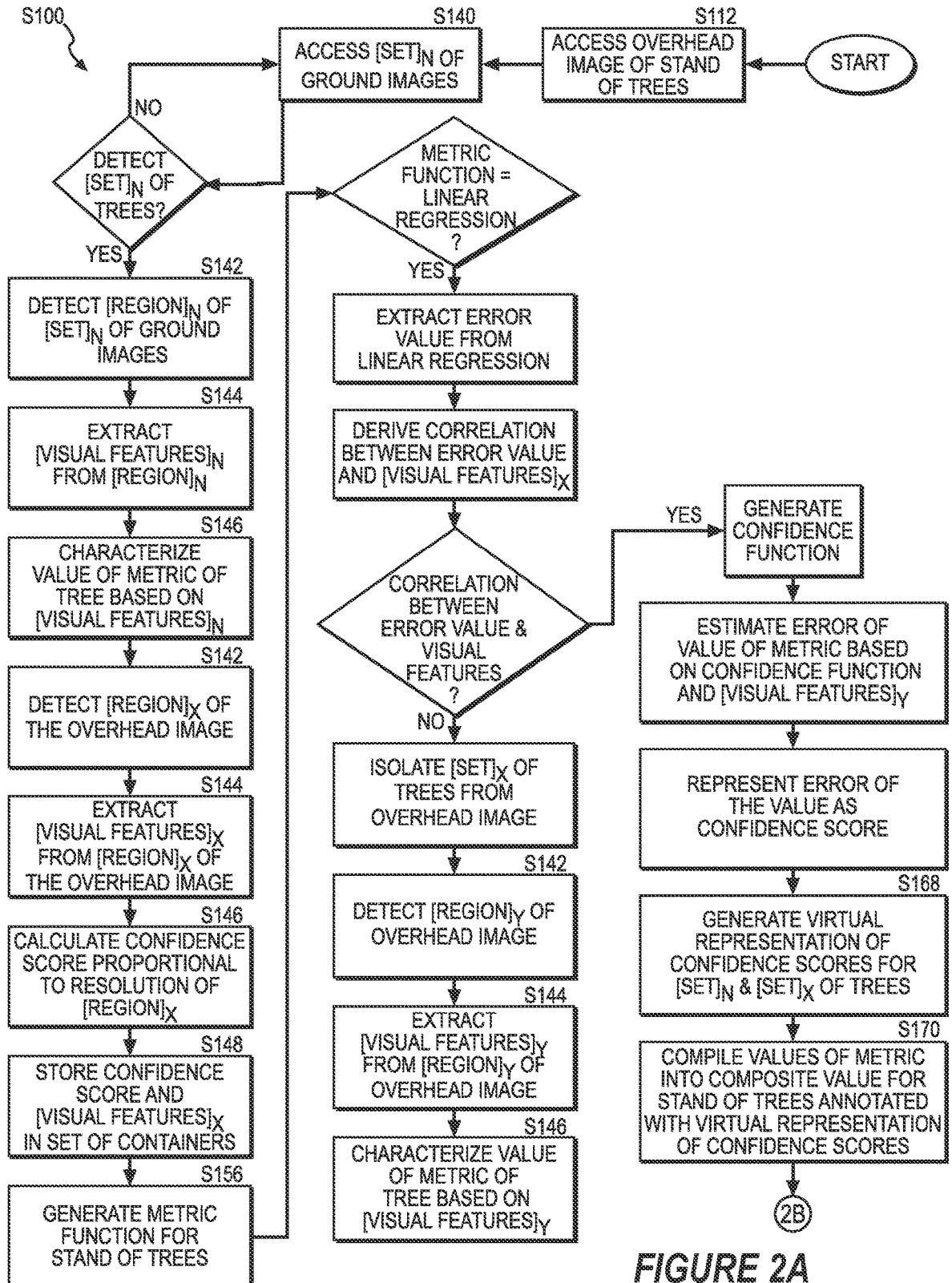
FIGS. 2A and 2B are flowchart representations of one variation of the method.
Figure 2B:
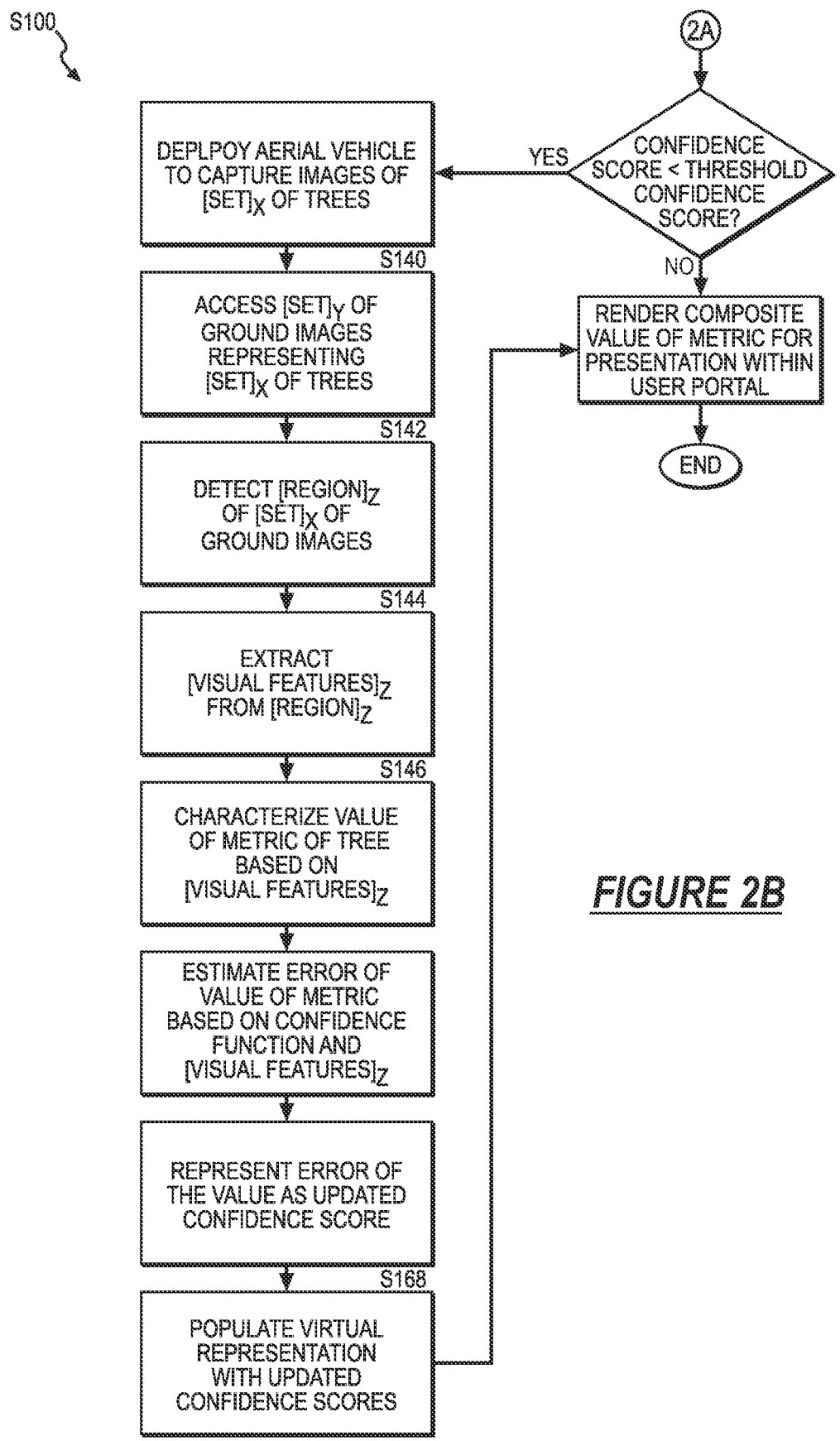

As shown in FIG. 2A, one variation of the method S100 includes: accessing an overhead image depicting a stand of trees in Block S112; accessing a set of ground images representing bases of the stand of trees and captured by an aerial vehicle in Block S140; and isolating a first set of trees, in the stand of trees, depicted in the set of ground images.

This variation of the method S100 further includes, for each tree in the first set of trees: detecting a first region of the set of ground images depicting the tree in Block S142; extracting a first set of visual features from the first region of the set of ground images in Block S144; characterizing a first value of a metric of the tree based on the first set of visual features in Block S146; detecting a second region of the overhead image depicting the tree in Block S142; extracting a second set of visual features from the second region of the overhead image in Block S144; calculating a confidence score of the first value of the metric of the tree proportional to a resolution of the first region of the set of ground images depicting the tree in Block S146; and storing the confidence score, the first value of the metric, and the second set of visual features in a container in a set of containers in Block S148.

This variation of the method S100 also includes isolating a second set of trees, in the stand of trees, excluded from the set of ground images and, for each tree in the second set of trees: detecting a third region of the overhead image depicting the tree in Block S142; extracting a third set of visual features from the third region of the overhead image in Block S144; and characterizing a second value of the metric of the tree based on the third set of visual features in Block S146. This variation of the method S100 further includes: generating a virtual representation of confidence scores for the first set of trees in Block S168; and compiling values of the metric, for the first set of trees and the second set of trees, into a composite value of the metric for the stand of trees annotated with the virtual representation of confidence scores in Block S170.

1.5 Variation: Metric Function

One variation of the method S100 includes: accessing a set of overhead images depicting a stand of trees in Block S112; accessing a set of ground images representing bases of the stand of trees in Block S140; and isolating a first set of trees, in the stand of trees, depicted in the set of ground images.

This variation of the method S100 further includes, for each tree in the first set of trees: identifying a first image, in the set of ground images, depicting the tree in Block S142; extracting a first set of visual features from the first image in Block S144; characterizing a value of a metric of the tree based on the first set of visual features in Block S146; detecting a first overhead image, in the set of overhead images, depicting the tree in Block S142; extracting a second set of visual features from the first overhead image in Block S144; and storing the value of the metric and the second set of visual features in a container in a set of containers in Block S148.

This variation of the method S100 also includes generating a metric function representing a correlation between values of the metric and visual features within the stand of trees in Block S156 and based on the set of containers, isolating a second set of trees, in the stand of trees, excluded from the set of ground images, and for each tree in the second set of trees: detecting a second image, in the set of overhead images, depicting the tree in Block S142; extracting a third set of visual features from the second overhead image in Block S144; and characterizing a second value of the metric of the tree based on the third set of visual features and the metric function in Block S146. This variation of the method S100 further includes compiling values of the metric, for the first set of trees and the second set of trees, into a composite value of the metric for the stand of trees in Block S170.

2. Applications

Generally, Blocks of the method S100 can be executed by a computer system in conjunction with an aerial vehicle to: access an overhead image of a stand of trees (e.g., an aerial image, satellite image, a georeferenced map); define an array of georeferenced scan zones within a boundary of the stand of trees; define a flight path through the array of scan zones for execution by the aerial vehicle; collect images of trees, images of the forest floor, and ambient data within these scan zones; implement machine learning and other computer vision techniques (e.g., object detection, edge detection, template matching) to detect visual features and extract characteristics (e.g., tree height, tree base diameter, bark characteristics, canopy characteristics) of trees within these scan zones from these images; and construct a virtual representation (e.g., three-dimensional representation) linking ambient conditions, tree characteristics, and images of the stand of trees.

More specifically, the computer system can access a low-resolution overhead image (e.g., aerial image, satellite image) of the stand of trees and virtually overlay a low-density array of discrete, isolated scan zones onto the overhead image, such as a two-dimensional grid array of 25-meter-diameter scan zones at 200-meter lateral and longitudinal pitch distances. The computer system can then define georeferenced coordinates for these scan zones and generate a flight path executable by the aerial vehicle to capture optical data (e.g., high-resolution images, depth images) and non-optical data (e.g., ambient data) of the stand of trees. The aerial vehicle can then navigate along the flight path to traverse above the tops of trees in each scan zone; vertically traverse between trees in each scan zone; traverse below the canopy of trees in each scan zone; and alternate above-canopy and below-canopy traversal between adjacent scan zones in the stand of trees, as shown in FIG. 3B.

The computer system can leverage the virtual representation of the stand of trees to predict tree characteristics (e.g., height, carbon volume, health, pest presence) and/or ambient conditions in regions of the stand of trees—unscanned by the aerial vehicle and/or excluded from the array of scan zones—based on visual features detected in the overhead image of the stand of trees.

Furthermore, the computer system can implement computer vision techniques (e.g., object detection, edge detection, template matching) to detect visual features (e.g., bark characteristics, pixel width, foliage characteristics) of each tree depicted in a high-resolution ground image and characterize a value of a metric associated with these visual features such as: tree type; tree species; pest risk; base diameter; fire risk; defects; carbon capture; etc. The computer system can then generate a metric function (e.g., a linear regression) representing a correlation between values of this metric and these visual features and leverage the metric function to characterize a value of the metric of each tree depicted in a low-resolution overhead image of the stand of trees. The computer system can further calculate a confidence score of each value of the metric proportional to the resolution of the high-resolution ground image depicting each tree. Additionally or alternatively, the computer system can leverage visual features and the linear regression to generate a confidence function to calculate confidence scores of trees depicted in the low-resolution overhead image.

2.1 Aerial Vehicle

The computer system can upload the flight path to an aerial vehicle, such as an autonomous unmanned aerial vehicle including a chassis, equipped with a flight controller, a geolocation module, a communications module, and a suite of sensors configured to capture photographic images of trees, capture depth maps, capture thermographic images, and/or collect ambient (e.g., environmental) data.

The aerial vehicle can include a suite of optical sensors mounted to the chassis via a set of gimbals. The suite of sensors includes: an RGB camera, a multispectral camera, and/or a LIDAR sensor facing downwardly from the chassis and configured to capture optical data of trees as the aerial vehicle traverses above tops of trees and downwardly within a scan zone. The aerial vehicle can also include a similar second suite of optical sensors facing upwardly from the chassis and configured to capture optical data of trees as the aerial vehicle traverses below the tree canopy and upwardly within a scan zone. The aerial vehicle can manipulate the first and second suites of optical sensors to capture lateral-, upward-, and downward-facing images during operation. Additionally or alternatively, the aerial vehicle can include a set of lateral-facing optical sensors. The aerial vehicle can further include: a temperature sensor; a humidity sensor; a light level sensor; and an ultrasonic proximity sensor.

During operation, the aerial vehicle can: access the flight path generated by the computer system; autonomously navigate along the flightpath; capture optical and ambient data within each scan zone and selectively between scan zones (e.g., along limited, linear paths). The aerial vehicle can: autonomously navigate around tops of trees in the scan zone and capture optical images via downward-facing optical sensors; process images in real-time to identify a gap between the tree canopy and a forest floor; autonomously navigate through this gap toward the forest floor; and then autonomously navigate around bases of trees in the scan zone and capture optical images via upward, lateral, and/or downward-facing optical sensors. The aerial vehicle can autonomously navigate under the tree canopy to a next scan zone within the stand of trees and capture optical images via upward, lateral, and/or downward-facing optical sensors. The aerial vehicle can: autonomously navigate around bases of trees in this scan zone and capture optical images via upward-facing optical sensors; process images in real-time to identify a gap in the tree canopy between tops of trees in this scan zone; autonomously navigate through this gap to a location above tops of these trees; and then autonomously traverse above tops of trees in the scan zone and capture optical images via the set of downward-facing optical sensors.

The aerial vehicle can also execute simultaneous localization and mapping (SLAM) techniques to autonomously assemble a three-dimensional depth and/or color map of trees along the flight path.

2.2 Tree Feature Extraction

The computer system can then: access georeferenced optical and/or ambient data collected by the aerial vehicle, such as in real-time or following completion of the flight path; implement computer vision techniques to detect and extract characteristics of trees (e.g., tree base diameter, tree color, tree height, foliage density, canopy characteristics, tree type) in scan zones from these images; derive correlations between these tree characteristics; and then assemble these correlations into tree characteristics model for the stand of trees.

The computer system can also aggregate optical data (e.g., optical images, depth images) collected by the aerial vehicle while navigating along the flight path into a three-dimensional representation (e.g., a sparse spatial representation) of the stand of trees. The computer system can further leverage these optical data and the overhead image of the stand of trees to interpolate or predict characteristics of trees (e.g., locations, sizes, foliage density, health, canopy characteristics) excluded from the array of scan zones (e.g., unscanned trees, trees arranged between scan zones); and populate the three-dimensional representation of the stand of trees with these additional predicted tree characteristics.

2.3 Stand Metrics

Furthermore, the computer system can extrapolate metrics of the stand of trees from the three-dimensional representation and present these metrics to a user via a user interface (e.g., user portal, audit tool). For example, the computer system can present a visual representation of the stand of trees and corresponding metrics to the user within the user portal, such as including: gross tree count; tree count by species; average tree height; average tree base diameter; total timber volume; tree density; tree health; pest presence or severity; and/or fire risk.

Additionally, the computer system can present metrics of the stand of trees as a management report, as a heatmap of base diameters of trees, and/or as a histogram of tree quantities for review by the user within the user portal. The user can further interface with the user portal to review metrics of interest and filter the metrics such as by confidence score.

3. Aerial Vehicle

In one implementation, the aerial vehicle defines an autonomous airborne robotic system including: a chassis; a flight controller; a geolocation module; a wireless communications module; and a sensor suite including optical sensors (e.g., an RGB camera, a hyper-spectral camera, a LIDAR sensor), proximity sensors, and/or ambient condition sensors (e.g., temperature sensor, humidity/moisture sensor, light intensity sensor). The aerial vehicle is configured to: autonomously navigate to above, below, and around a stand of trees; record optical (e.g., RGB, depth, multispectral) images of trees and other objects within the stand of trees; write a georeferenced location and altitude of the aerial vehicle to each optical image (e.g., via the geolocation module); track and maintain minimum distances from other objects (e.g., via the LIDAR sensor); record ambient conditions (e.g., via ambient sensors); and transmit image and geospatial location data to the computer system via the communications module.

In one implementation, the aerial vehicle includes: a suite of upward-facing optical sensors (e.g., RGB color and LIDAR depth sensors) mounted above the aerial vehicle chassis and oriented with fields of view directed upwardly from the chassis; and a suite of downward-facing optical sensors mounted below the aerial vehicle chassis and oriented with fields of view directed downwardly from the aerial vehicle chassis.

In another implementation, the aerial vehicle includes a suite of proximity sensors oriented about the aerial vehicle chassis and configured to detect proximity of objects—such as tree limbs or biowaste on a forest floor—above, below, and adjacent the aerial vehicle. For example, the aerial vehicle can include ultrasonic, electromagnetic, RADAR, and/or SONAR sensors fixedly- or dynamically-mounted to the aerial vehicle chassis.

4. Computer System

The computer system—such as a remote server—can manipulate overhead images depicting a stand of trees and generate a flight path defining an order of waypoints for an aerial vehicle to execute. Additionally, the computer system can receive optical data (e.g., hi-resolution images) and non-optical data (e.g., ambient data, proximity data, geospatial location data) from the aerial vehicle via the communications module. The computer system can also execute simultaneous localization and mapping (or "SLAM") techniques to autonomously assemble a three-dimensional depth and/or color map of the stand of trees along the flight path of the aerial vehicle based on data collected by the suite of sensors mounted to the aerial vehicle.

Furthermore, the computer system can then: access these optical and non-optical data collected by the aerial vehicle, such as in real-time or following termination of the flight path; implement computer vision techniques to detect and extract characteristics of a set of trees (e.g., tree base diameter, tree color, foliage density, pest pressure, carbon volume, tree trunk height, lower tree characteristics, canopy tree characteristics) in each scan zone from these images; manipulate these optical and non-optical data to generate a spatial zone model (or "three-dimensional representation") of each scan zone within a boundary of the stand of trees; and construct models linking these characteristics of trees within the stand of trees. The computer system can then assemble a three-dimensional representation of the stand of trees and extract metrics and insights of the forest, and/or present these metrics and insights to a user (e.g., stand manager or owner affiliated with the forest) based on these data.

4.1 Pre-Scan Setup

Figure 1B:
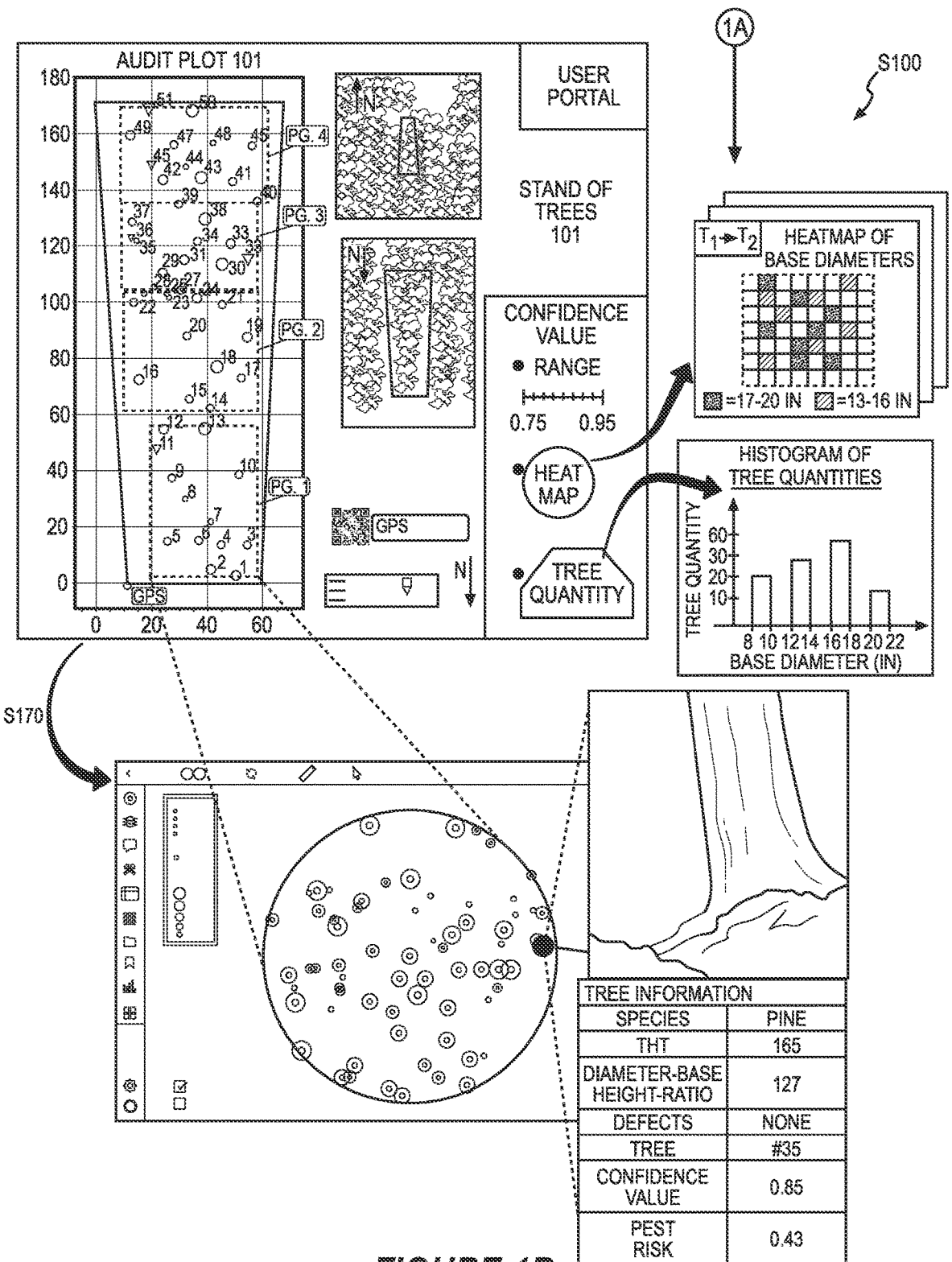

As shown in FIGS. 1A and 1B, in preparation for scanning and modeling a stand of trees, the computer system can access an overhead image of the stand of trees, such as an existing satellite image or an aerial scouting image captured by an external manned or unmanned aerial scouting vehicle. The computer system can: virtually overlay a set of scan zones onto the overhead image; generate a nominal flight path extending within and between the scan zones; and upload the nominal flight path to the aerial vehicle for execution.

In one implementation, the computer system can: access a low-resolution overhead image depicting a stand of trees (e.g., a previously recorded higher-altitude aerial image, a satellite image); access a boundary of the stand of trees; projects the boundary onto the overhead image; virtually overlay an array of scan zones, arranged in a two-dimensional grid, onto the overhead image within the boundary of the stand of trees; assign a set of georeferenced coordinates to each sample zone; and calculate a nominal scan route (or "flight path) from a scan initiation point (e.g., at a first scan zone), through each scan zone, and to a scan termination point (e.g., at a last scan zone) for execution by an aerial vehicle.

4.2 Pre-Scan Flyover

In one variation, prior to the initiation of the flight path, the computer system can: deploy the aerial vehicle to overfly the stand of trees and capture a set of georeferenced overhead images of the stand of trees characterized by an initial resolution (e.g., low-resolution images); access the set of images captured by the aerial vehicle; stitch the set of images into a composite overhead image of the stand of trees; virtually overlay an array of scan zones, onto the composite overhead image; assign georeferenced coordinates to each scan zone; and calculate a flight path from a scan initiation point (e.g., at a first scan zone), through each scan zone, and to a scan termination point (e.g., at a last scan zone).

For example, the computer system can deploy a set of aerial vehicles to a stand of trees to capture a set of overhead images of the stand of trees. In this example, the computer system deploys a first aerial vehicle to collect a set of high-resolution, low altitude overhead images of the stand of trees within the boundaries of the stand of trees. The first aerial vehicle transmits this set of images and non-optical data to the computer system in real-time. The computer system can then: compile (i.e., stitch) the set of images captured by the aerial vehicle into a composite overhead image of the stand of trees; and virtually overlay an array of sample zones, arranged in a two-dimensional grid, onto the composite overhead image. Then, the computer system can: assign a set of discrete geolocation coordinates to each scan zone in the array of scan zones; calculate a flight path for execution by a next aerial vehicle in the set of aerial vehicles; and transmit the flight path to the next aerial vehicle. The computer system can then deploy the next aerial vehicle to execute the flight path for the stand of trees.

Therefore, the computer system can access an overhead image captured by a scouting aerial vehicle at an altitude above the tops of the stand of trees and/or deploy an aerial vehicle to capture a set of high-resolution images at a lower altitude (e.g., near the tops of the stand of trees) and stitch these images into a high(er)-resolution overhead image of the stand of trees.

4.3 Grid Array of Scan Zones

In one variation, the computer system can: access an overhead image depicting the stand of trees; extract visual features from regions of the overhead image; characterize a difference between visual features of a first region and a second region of the overhead image; and project an array of scan zones onto the overhead image—within the boundary of the stand of trees—based on the difference.

Furthermore, the computer system can virtually overlay a two-dimensional grid array of 25-meter-diameter scan zones at 200-meter lateral and longitudinal pitch distances onto the overhead image. In this variation, the computer system can project a two-dimensional grid array of scan zones onto the overhead image, each scan zone: defining a minimum diameter within a target diameter range (e.g., between 20-meter-diameter and 30-meter-diameter, between 23-meter-diameter and 27-meter-diameter); defining a lateral pitch distance greater than the minimum diameter and less than a maximum width of the boundary of the stand of trees (e.g., 200 meter lateral pitch distance); and defining a longitudinal pitch distance greater than the minimum diameter and less than a maximum length of the boundary of the stand of trees (e.g., 200 meter longitudinal pitch distance).

For example, the computer system can: access an overhead image depicting the stand of trees; extract a first set of visual features from a first region—representing tree characteristics of a first set of trees—of the overhead image; extract a second set of visual features from a second region—representing tree characteristics of a second set of trees—of the overhead image; and characterize a difference between the first set of visual features and the second set of visual features. Then, in response to the difference between the first set of visual features and the second set of visual features exceeding a difference threshold (e.g., 70%), the computer system can: project a first scan zone (e.g., defining a 25-meter-diameter) onto the first region of the overhead image to encompass the first set of trees; and project a second scan zone (e.g., defining a 25-meter-diameter, a 200 meter lateral pitch distance, and a 200 meter longitudinal pitch distance from the first scan zone), onto the second region of the overhead image to encompass the second set of trees.

The computer system can repeat these methods and techniques for each other set of trees and for each other scan zone to virtually overlay the array of scan zones onto the overhead image. However, the computer system can overlay the array of scan zones onto the overhead image in any other way.

4.4 Flight Path

The computer system can then define georeferenced coordinates for these scan zones and generate a georeferenced flight path executable by an aerial vehicle to capture a sparse set of images and ambient data of the stand of trees. Furthermore, the computer system can define a flight path from a scan initiation point (e.g., at a first scan zone), through each scan zone, and to a scan termination point (e.g., at a last scan zone) for execution by the aerial vehicle.

In one implementation, the computer system can define a flight path including: a first waypoint at a first altitude above a first set of trees within a first scan zone; a second waypoint at a second altitude proximal a first floor (e.g., within a threshold distance of the first floor) within the first scan zone; a third waypoint at a third altitude proximal a second floor (e.g., within a threshold distance of the second floor) within a second scan zone; a fourth waypoint at a fourth altitude above a second set of trees within the second scan zone; and a fifth waypoint at a fifth altitude above a third set of trees within a third scan zone. The computer system can then upload the flight path to an aerial vehicle to scan the stand of trees, as further described below.

4.5 Gap Preplanning

In one implementation, the computer system can access an overhead image of the stand of trees prior to deploying the aerial vehicle, and implement computer vision techniques (e.g., edge detection, object detection, spectral analysis, depth perception) to: identify discolorations and/or abnormalities in the overhead image of the canopy that may correspond to gaps in the canopy for traversal by the aerial vehicle during the scan routine; assign georeferenced coordinates to the identified gap; and modify the flight path to intersect the identified gap.

In particular, prior to deploying the aerial vehicle, the computer system can: access an overhead image of the stand of trees; isolate a region of the image corresponding to a first scan zone; and isolate pixels representing darker colors (e.g., lower color intensity) within the region of the image. The computer system can then: identify clusters of pixels representing these darker colors within other regions of the overhead image; characterize a minimum width of each identified cluster of pixels from each region of the overhead image; discard clusters of pixels characterized by a minimum width less than the maximum width of the aerial vehicle; and record the remaining cluster of pixels as potential gaps in the canopy of the stand of trees. The computer system can access the geolocation coordinates associated with each potential gap in the canopy; adjust the flight path to intersect the coordinates of each potential gap within the first scan zone.

Therefore, the computer system can enable the aerial vehicle to detect gaps in the canopy with a minimum width greater than a maximum dimension of the aerial vehicle and traverse vertically from above-canopy to below-canopy of the stand of trees—and vice versa.

5. First Scan Zone

The computer system can deploy the aerial vehicle to the first scan zone to collect optical and non-optical data (e.g., ambient condition data) of the first scan zone. The aerial vehicle can then collect optical data and location data of a first set of trees within the first scan zone via the optical sensor and geolocation module.

In one implementation, the aerial vehicle can traverse above a first set of trees within the first scan zone and capture images above the canopy of the first set of trees proximal the first waypoint. The aerial vehicle can then: analyze these images to identify a gap in the canopy. The aerial vehicle can then execute a downward vertical traversal through the gap in the canopy into the first scan zone and capture a sequence of images and ambient data during the traversal. The aerial vehicle can further detect a proximity to the forest floor via the depth sensor and execute a base scan routine through the first scan zone to collect optical and ambient condition data within the first scan zone. At the conclusion of the base scan routine, the aerial vehicle can traverse underneath the canopy to a second scan zone.

5.1 Over-Canopy Transversal to First Scan Zone

In one implementation, the computer system can deploy the aerial vehicle from a location proximal the stand of trees. The computer system can then communicate with a geolocation service, via a GPS module of the aerial vehicle, to retrieve the current geolocation of the aerial vehicle. The computer system can then calculate a flight path from the current location, over the top of the canopy of the stand of trees, to a first waypoint above the first scan zone.

During traversal to the first scan zone, the aerial vehicle can: monitor a current position via the depth sensor and remain on the flight path; and capture a set of georeferenced high resolution overhead images of the canopy, via the optical sensor, proximal the flight path. The aerial vehicle can cease traversal in response to detecting a current location of the aerial vehicle corresponding to the first waypoint (e.g., a set of geolocating coordinates) assigned to the first scan zone.

In one variation, the aerial vehicle can: capture a current image of the canopy proximal the aerial vehicle; access a previously captured image of the first scan zone; and apply computer vision techniques (e.g., template matching, object detection, edge detection) to compare the current image to the previous image. In response to features detected in the current image corresponding to features detected in the previous image, the aerial vehicle can initiate the scan routine above the first scan zone.

5.2 Overhead Canopy Gap Scan

In one implementation, the aerial vehicle can navigate along the flight path to the first waypoint above the first scan zone and initiate an overhead gap scanning procedure above the canopy of the first scan zone. The aerial vehicle can: navigate to the first waypoint of the flight path (e.g., a center point) of the first scan zone; and traverse along an outward spiral flight path from the center point of the scan zone toward the perimeter of the scan zone. During the traversal, the aerial vehicle can: collect geolocation data; capture color images of the canopy of the first scan zone (e.g., tops of trees) proximal the first waypoint via an optical sensor facing tops of the stand of trees; collect depth data via a depth sensor (i.e., LIDAR); and collect ambient data, such as temperature and/or humidity.

5.3 Overhead Canopy Gap Detection

Generally, during the overhead canopy gap scanning procedure, the aerial vehicle can analyze each image and associated depth data in real-time using computer vision techniques to identify a gap in the canopy greater than a maximum dimension of the aerial vehicle (e.g., maximum width). The aerial vehicle can simultaneously assemble the set of images—captured in real-time—into a composite image and aggregate the location and depth data associated with each image into a canopy profile (i.e., a spatial representation of the canopy.)

In one implementation, the aerial vehicle can: access the depth images; sequentially rank the depth images by location in the scan zone from greatest to least; access an image associated with the greatest depth image; and analyze the image via computer vision techniques to identify a potential gap larger than the maximum dimension of the aerial vehicle at this location. In one variation, the aerial vehicle can rank the potential gaps in order of distance from the current location, to reduce the traversal time from the current location to the potential gap in the canopy, therefore reducing total scan time.

In another implementation, the aerial vehicle can: access a raw two-dimensional image depicting the canopy from above (or a composite two-dimensional image stitched together from a set of images captured by the aerial vehicle); identify a set of low color intensity value (i.e., dark) pixels in the image corresponding to the forest floor (e.g., filters the image to identify all pixels within the image with a total color intensity value of R, G, and/or B that correspond to dark green or brown colors associated with earth, or forest floor terrain); identify a cluster of low color intensity value pixels within the image; isolate a set of pixels in the cluster with greatest minimum width; access the location of the set of pixels with the greatest minimum width, based on geolocation data associated with the raw two-dimensional image; and identify the location as a gap in the canopy.

Furthermore, the computer system can assemble (e.g., stitch) depth images captured by the aerial vehicle into a spatial representation extending below the canopy. The computer system can identify a set of greatest depth images (e.g., by rank ordering depth images, by identifying depth images greater than a threshold depth.) The computer system can then plane fit the set of greatest depth images to points representing a floor in the spatial representation of the scan zone.

Therefore, the aerial vehicle can leverage onboard optical sensors to autonomously scan the canopy for gaps approximating a maximum dimension of the aerial vehicle. The aerial vehicle can autonomously identify gaps in and navigate through the canopy to capture images of trees below the canopy. The aerial vehicle can identify and traverse gaps in the canopy to traverse over the canopy and descend into a scan zone through the canopy to complete an under-canopy scan of the scan zone, and thereby navigate an accurate and repeatable flight path.

5.4 Downward Traversal

In one implementation, the aerial vehicle can navigate from the first waypoint above a first set of trees within the first scan zone (e.g., above the canopy) to face a gap in the canopy. The aerial vehicle then vertically traverses through the gap and descends downward to a second waypoint proximal the floor of the first scan zone. During descent, the aerial vehicle can: capture images of tree trunks and other objects proximal the aerial vehicle via the optical sensor; continuously detect the distance between the base of the aerial vehicle and the forest floor via a distance sensor (e.g., LIDAR) facing the forest floor; and, in response to the distance between the base of the aerial vehicle and the forest floor dropping below a threshold distance, cease descent through the gap.

In one variation, an ultrasonic proximity sensor is mounted to the aerial vehicle and configured to output signals corresponding to distances between the aerial vehicle and the forest floor. The aerial vehicle can interpret a distance based on a first signal from the proximity sensor and, in response to the distance exceeding a threshold collision distance, cease descent and thereby avoid collision with the forest floor.

For example, the aerial vehicle can traverse downward and capture images of a set of proximal trees that define the gap boundary in the canopy. Generally, the aerial vehicle can identify the set of proximal trees to include a minimum amount of tree trunks (e.g., three) to define the length and width of the gap boundary. The aerial vehicle can also detect a distance between the aerial vehicle and each tree in the set of proximal trees. Additionally, the aerial vehicle can capture a vertical sequence of images representing trunks and/or visible branches of an additional set of trees—located beyond the set of proximal trees and within the field of view of the lateral optical sensor—while navigating from the first waypoint to a second waypoint of the first scan zone. Further, the aerial vehicle can capture images of bases of trees (e.g., underside of the canopy), via the upward-facing optical sensor, and captures images of the forest floor, via the downward-facing optical sensor. The aerial vehicle can then traverse downward and detect a distance from the base of the aerial vehicle to the forest floor via the distance sensor (e.g., LIDAR sensor.) Then, in response to the distance falling below a threshold distance (e.g., two feet, one meter), the aerial vehicle can cease the downward traversal.

Therefore, the aerial vehicle can autonomously traverse down through a set of trees to an area below the canopy of the scan zone to reach the forest floor and leverage a distance sensor to avoid collisions with obstacles (e.g., trees, shrubs, branches) within the scan zone. Additionally, the aerial vehicle can calculate a height of each tree proximal the aerial vehicle based on the images captured and the distance detected from the aerial vehicle to the forest floor.

5.5 Base Scan within First Scan Zone

In one implementation, the aerial vehicle can navigate from the first waypoint above the first scan zone to the second waypoint proximal a floor of the first scan zone. The aerial vehicle can then: execute a base scan routine through the first scan zone; and execute simultaneous localization and mapping (hereinafter "SLAM") techniques to avoid collisions with detected obstacles via the distance sensor. The aerial vehicle can navigate along the flight path and capture: upward images depicting bases of trees (e.g., the underside of the canopy), via an upward-facing optical sensor; downward images depicting the forest floor, via a downward-facing optical sensor; and lateral images depicting the trunks and branches of trees. Additionally, the aerial vehicle can capture color and depth images of tree canopies, tree bases, and the forest floor via the upward, lateral, and downward-facing sensors. At the conclusion of the base scan routine, the aerial vehicle can navigate along the flight path to a second scan zone and execute SLAM techniques to avoid obstacles as the aerial vehicle traverses to the second scan zone.

The aerial vehicle can additionally capture depth images of the underside of the canopy. The computer system can then access these under-canopy depth images to augment the spatial representation of the canopy. Further, the aerial vehicle can capture ambient conditions (i.e., temperature, humidity, light levels) within the under-canopy area of the scan zone.

For example, upon completion of the vertical traversal, the aerial vehicle can execute SLAM techniques to navigate along the nominal flight path and avoid detected obstacles. The aerial vehicle can then capture images of the underside of the canopy depicting branches, and foliage, and gaps in the canopy via the optical sensor(s) and detect distances to trees or other objects proximal the aerial vehicle via the distance sensor(s) while navigating along the flight path. The aerial vehicle can gradually increase altitude as the aerial vehicle laterally traverses through the first scan zone (i.e., completes an upward spiral pattern through the first scan zone). Upon completion of a segment of the flight path through the first scan zone, the aerial vehicle can: navigate along the flight path to a second scan zone; decreases altitude; and execute SLAM techniques to navigate under the canopy along the nominal flight path to the second scan zone, as shown in FIG. 3B.

Further, the computer system can compile the georeferenced base scan data captured in the first scan zone with the overhead canopy scan data of the first scan zone to link base diameters of trees to corresponding tops of trees within the first scan zone by matching the location of each tree base identified in the base scan to the location of each treetop identified in the canopy scan. In particular, the computer system can directly detect the height of the trees proximal the aerial vehicle during the vertical traversal. The computer system can further apply the detected base-to-height correlation to the remaining treetops identified in the canopy of the first scan zone to extrapolate the height of the trees in the first scan zone.

5.6 Under-Canopy Zone-to-Zone Traversal

In one implementation, upon termination of a base scan routine within the first scan zone, the aerial vehicle can navigate along the flight path from the second waypoint proximal the floor of the first scan zone to the third waypoint proximal the second scan zone (e.g., under the canopy of trees to a second scan zone). The aerial vehicle can execute SLAM techniques to follow the flight path, and simultaneously capture images of the underside of the canopy and the forest floor, such as locations and widths of tree bases, tree trunks, and other objects; and collect ambient condition data while navigating from the second waypoint to the third waypoint.

In one variation, in response to detecting a density of trees proximal the first scan zone greater than a threshold density (i.e., the forest is very thick and the aerial vehicle cannot exit the scan zone beneath the canopy), the aerial vehicle can traverse to the second waypoint within the first scan zone, vertically beneath the gap in the canopy previously traversed to enter the first scan zone, and traverse through the gap in the canopy. Once above the canopy, the aerial vehicle can navigate to the second scan zone, identify a gap in the canopy, and traverse through this gap to scan the second scan zone.

Therefore, the aerial vehicle can utilize onboard optical sensors to autonomously scan tree bases and the underside of the canopy proximal the aerial vehicle while traversing from a first scan zone to a second scan zone underneath the canopy. By traversing beneath the canopy, the aerial vehicle can capture images of additional tree bases in locations outside the first or second scan zones, and the computer system can further derive correlations between these additional images and an overhead image of trees in the stand. The computer system can analyze the additional images of tree bases between scan zones to characterize trends between scan zones. The aerial vehicle can execute an under-canopy traversal between a first scan zone and a second scan zone when brush and tree density conditions are favorable to an under-canopy traversal. In other situations in which a dense forest with many obstacles (i.e., trees, brush) could slow the progress of the aerial vehicle, the aerial vehicle can autonomously identify a gap in the canopy, traverse the gap to the area above the scan zone, and travel to the second scan zone over the canopy.

6. Second Scan Zone

In one implementation, the aerial vehicle can navigate along the flight path from the second waypoint to the third waypoint proximal a floor of the second scan zone (e.g., under the canopy of the trees). The aerial vehicle can then implement the methods and techniques described above for the second scan zone. During the base scan through the second scan zone, the aerial vehicle can complete an under-canopy scan to identify a gap in the canopy in order to exit the scan zone and continue navigation along the flight path to a third scan zone. At the completion of the base scan routine, the aerial vehicle can traverse to a location beneath the identified gap and ascend in an upward vertical traversal from the third waypoint to a fourth waypoint above the second scan zone (e.g., above the canopy of trees). Once above the canopy of trees, the aerial vehicle can execute an overhead canopy scan of the second scan zone prior to traversing over the canopy to a third scan zone.

In one variation, in response to detecting a density of trees in the canopy of the second scan zone greater than a threshold density (i.e., the canopy is very thick, and not enough space exists for the aerial vehicle to exit the scan zone through the canopy), the aerial vehicle can traverse to a third scan zone under the canopy.

6.1 Under-Canopy Scan

In one implementation, the aerial vehicle can execute an under-canopy scan routine to identify a gap in the canopy in order to exit the scan zone. The aerial vehicle can simultaneously execute the base scan routine of the second scan zone. In this implementation, the aerial vehicle can: navigate along the flight path through the second scan zone; collect a set of georeferenced upward-facing depth images (i.e., from the aerial vehicle to the underside of the canopy); and, in response to detecting a depth image depicting a distance greater than a threshold distance, flag the location as a potential gap in the canopy. Further, the aerial vehicle can aggregate (i.e., stitch) the set of upward-facing depth images into a spatial representation of the canopy.

Alternatively, the aerial vehicle can capture georeferenced optical data (i.e., color images, light intensity levels), during the base scan routine. The aerial vehicle can then access and analyze the images using computer vision techniques and/or color intensity analysis to detect a gap in the canopy based on the image.

In one variation, the aerial vehicle can execute a second under-canopy scan routine to identify gaps in the canopy, in addition to the base scan routine.

6.2 Under-Canopy Gap Detection

Generally, during the under-canopy gap scanning procedure, the aerial vehicle can analyze each image and associated depth data in real-time using computer vision techniques to identify a gap in the canopy greater than the maximum width of the aerial vehicle. The aerial vehicle can also assemble the set of images into a single two-dimensional composite image and can further aggregate the location and depth data associated with each image to produce an under-canopy profile (e.g., a spatial representation of the canopy).

In particular, the aerial vehicle can: access a raw two-dimensional image depicting the underside of the canopy from below, captured by the aerial vehicle (or a composite two-dimensional image stitched together from a set of images captured by the aerial vehicle); identify a set of high color intensity value pixels in the image (i.e., filters the image to identify all pixels within the image with a total color intensity value of R, G, and/or B greater than a threshold color intensity value); identify a cluster of high color intensity value pixels within the image; isolate a set of pixels in the cluster with greatest minimum width; detect a location of the set of pixels with the greatest minimum width, based on geolocation data associated with the raw two-dimensional image; and identify the location of the set of pixels as a gap in the canopy.

Alternatively, the aerial vehicle can: convert the color intensity values to greyscale; identify pixels with a greyscale color intensity value greater than a threshold color intensity value; identify cluster of high color intensity value pixels within the image; isolate a set of pixels in the cluster with greatest minimum width; detect a location of the set of pixels with the greatest minimum width, based on geolocation data associated with the raw two-dimensional image; and identify the location of the set of pixels as a gap in the canopy. In this implementation, the aerial vehicle can access a static threshold color intensity value representative of a boundary between light levels above the canopy and light levels below the canopy. The static threshold color intensity value can be pre-loaded to the aerial vehicle prior to execution of the scan routine. The aerial vehicle can calculate a difference in the color intensity (grayscale) detected by the optical sensors on the aerial vehicle and the threshold color intensity. In response to detecting the color intensity greater than the threshold color intensity, by greater than a threshold difference, the aerial vehicle can verify the current position above the canopy. Conversely, in response to detecting the color intensity less than the threshold color intensity, by greater than a threshold difference, the aerial vehicle can verify the current position below the canopy.

In another implementation, the aerial vehicle can apply a dynamic threshold color intensity value by collecting a sample color intensity value when positioned above the canopy and recalibrate the threshold color intensity value prior to each descent through the canopy based on the collected sample color intensity value. Thus, the aerial vehicle can apply the dynamic threshold color intensity value based on the previously recorded conditions above the canopy to increase the sensitivity of the comparison between the color intensity values of individual pixels and to adjust the threshold color intensity value to a percentage of the collected sample color intensity value.

For example, the aerial vehicle can initiate the scan routine at the first scan zone and collect a first sample color intensity value of R=64, G=156, B=255, above the canopy corresponding to current conditions at the first scan zone (e.g., a blue sky). The aerial vehicle can then: execute the scan routine within the first scan zone; calibrate the threshold color intensity value to ~90% of the first sample color intensity value (e.g., R=57, G=140, B=229); and navigate along the flight path to the second scan zone. The aerial vehicle can isolate a cluster of pixels with R, G and/or B color intensity greater than the threshold values and exhibiting a greatest minimum width greater than the maximum dimension of the aerial vehicle (e.g., maximum width) and thereby, identify a gap in the canopy within the second scan zone. The aerial vehicle can then traverse through the gap and initiate an overhead scan of the canopy of the second scan zone.

The aerial vehicle can then navigate along the flight path over the canopy to the third scan zone. The aerial vehicle can similarly collect a second sample color intensity value of R=201, G=226, B=255, above the third scan zone corresponding to current conditions (e.g., an overcast sky). The aerial vehicle can then: descend through a gap in the canopy; execute a scan routine within the third scan zone; and recalibrate the threshold color intensity value to ~80% of the second sample color intensity value (e.g., R=160, G=190, B=204), corresponding to current conditions above the canopy in the third scan zone. The aerial vehicle can then navigate along the flight path to a fourth scan zone. The aerial vehicle can identify a cluster of pixels with R, G and/or B color intensity greater than the recalibrated threshold values and exhibiting a greatest minimum width greater than the maximum width of the aerial vehicle and thereby identify a gap in the canopy within the fourth scan zone. The aerial vehicle can then navigate through the gap to above the canopy.

In another implementation, the aerial vehicle can: access the depth images recorded at locations within the scan zone and assemble (e.g., stitch) the depth images into a composite depth image of the canopy; identify pixels, within the composite depth image, of infinite depth magnitude; identify a cluster of pixels of infinite magnitude; isolate a set of pixels in the cluster of greatest minimum width; detect a location of the set of pixels with the greatest minimum width, based on geolocation data associated with the depth image; and identify the location of the set of pixels as a gap in the canopy.

Alternatively, the aerial vehicle can identify a group of pixels of infinite depth magnitude via a LIDAR sensor. The aerial vehicle can then interpret a pixel of infinite depth magnitude as a potential gap in the canopy. The aerial vehicle can then identify a cluster of pixels of infinite depth magnitude with a greatest minimum width approximating a maximum width of the aerial vehicle as a gap in the canopy.

In another implementation, the aerial vehicle can: traverse to the location of a next potential gap in the canopy; activate the upward-facing proximity sensor; and ascend toward the potential gap. In response to a signal from the upward-facing proximity sensor indicating an obstruction, the aerial vehicle can cease the ascent. Later, the computer system can access this location and update the set of locations in the stand of trees to indicate absence of a gap in the canopy at this recorded location. The aerial vehicle can then traverse to a next location of an identified gap in the canopy.

6.3 Vertical Traversal

As shown in FIG. 3B, in response to identifying a gap in the canopy, the aerial vehicle can traverse to a position below the identified gap in the canopy and ascend toward the gap. During the ascent (e.g., vertical traversal through the identified gap), the aerial vehicle can: capture images of tree trunks and other objects proximal the aerial vehicle via the optical sensor; detect and record a light level and/or a color value within the gap via a light level sensor and/or the optical sensor. In response to detecting a light level exceeding a threshold light level and/or detecting a color value falling within a threshold difference of a target color value, the aerial vehicle can identify traversal through the gap and above the canopy.

In one variation, the aerial vehicle can continuously detect the distance between the base of the aerial vehicle and the forest floor via a distance sensor (e.g., LIDAR) oriented downward; and cease traversal through the identified gap in response to the distance between the base of the aerial vehicle and the forest floor exceeding a threshold distance.

6.4 Overhead Scan of Second Scan Zone

Generally, upon termination of traversal through the gap in the canopy, the aerial vehicle can initiate an overhead gap scanning procedure above the canopy of the second scan zone.

The aerial vehicle can: traverse to the center of the scan zone; access a nominal flight path along an outward spiral from the center of the scan zone toward the perimeter of the scan zone; collect geolocation data; capture color images of the canopy below, via the downward-facing optical sensor; collect depth data via a depth sensor (i.e., LIDAR); and collect ambient data, such as temperature and/or humidity.

The computer system can then compile the georeferenced base scan data collected in the second scan zone with the overhead canopy scan data of the second scan zone in order to correlate an individual tree base diameter to an individual treetop within the second scan zone (e.g., matching the location of the tree base identified in the base scan to the location of the treetop identified in the canopy scan). In particular, the computer system can directly detect the height of the trees proximal the aerial vehicle during the vertical traversal. The computer system can further apply a base-to-height correlation to the remaining treetops identified in the canopy of the second scan zone to extrapolate the height of the trees in the second scan zone.

6.5 Over-Canopy Zone-to-Zone Traversal

In one implementation, as shown in FIG. 3B, at the conclusion of the overhead scan of the second scan zone, the aerial vehicle can navigate along the flight path from a current location, over the top of the canopy of the stand of trees, to a third scan zone. The aerial vehicle can: traverse from the second scan zone to the third scan zone; monitor a current position via the optical sensor; and capture a set of georeferenced high resolution overhead images of the canopy, via the optical sensor, along the flight path. The aerial vehicle can cease traversal in response to the current location corresponding to a set of geolocating coordinates assigned to the third scan zone.

7. Other Zones

Figure 3A:
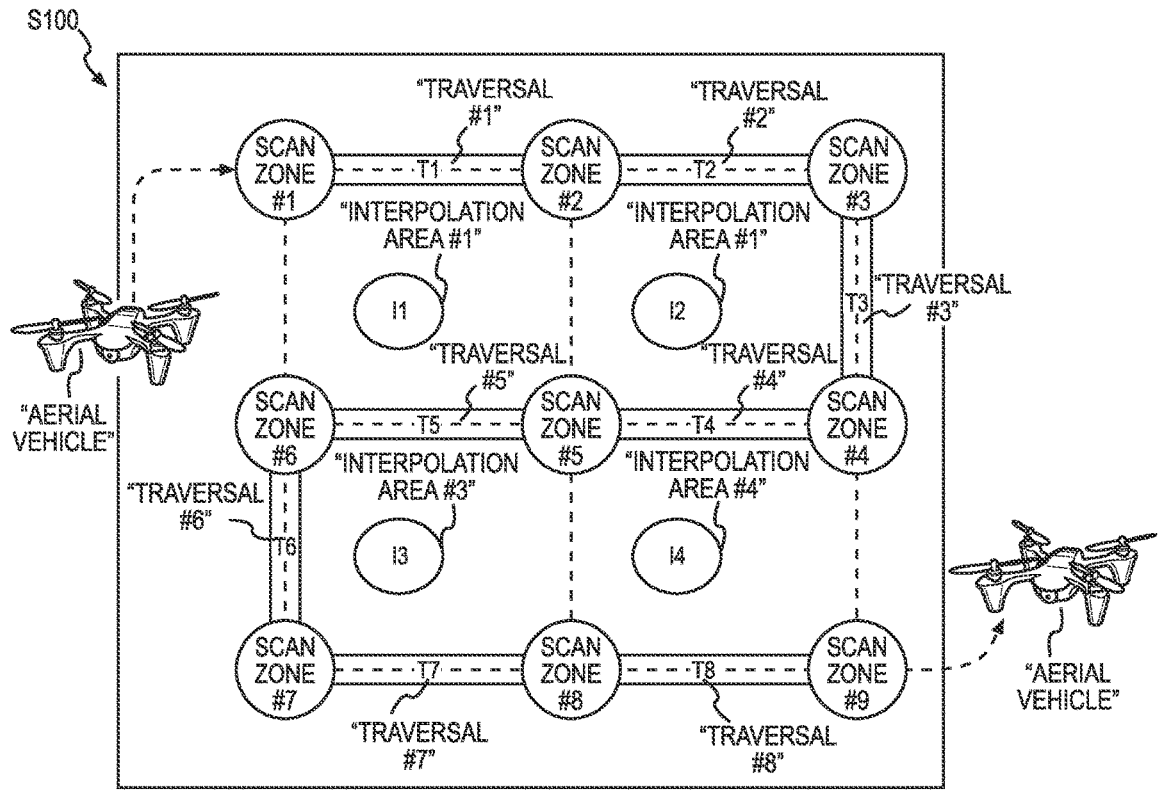
FIGS. 3A-3B are schematic representations of one variation of the method.
Figure 3B:
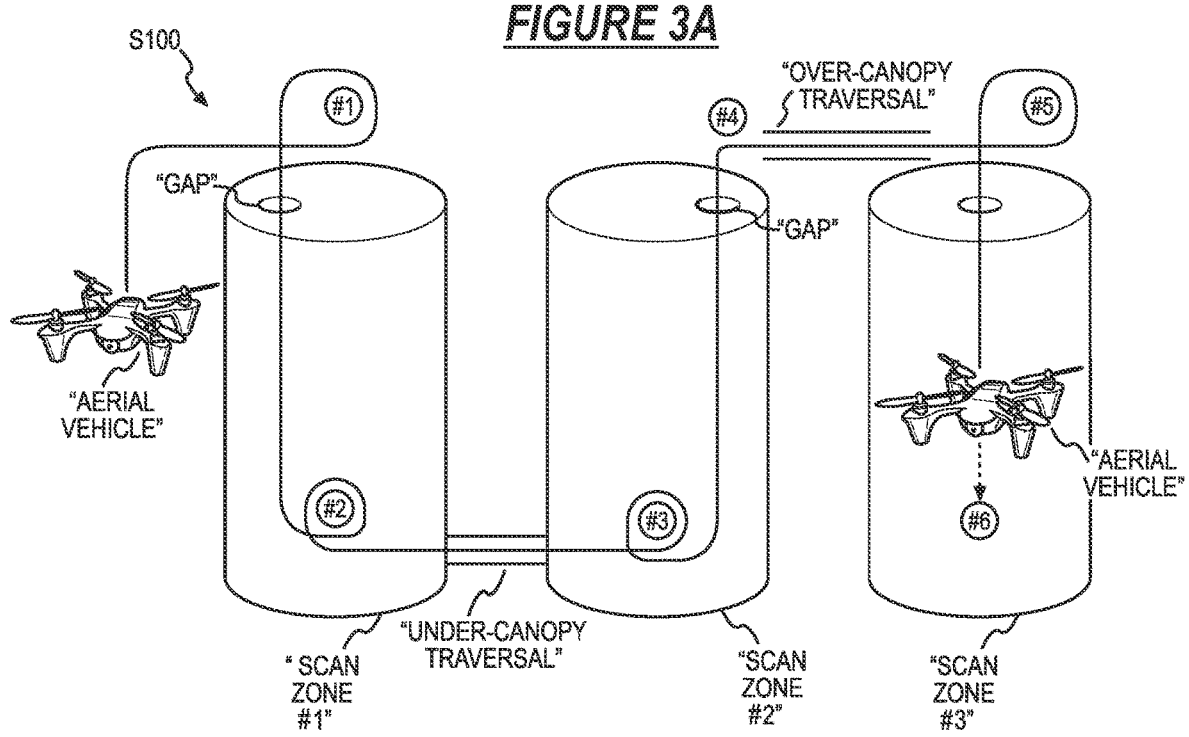

The aerial vehicle can implement methods and techniques described above for each subsequent set of scan zones, under-canopy traversals, over-canopy traversals, and/or vertical traversals in the scan routine within the stand of trees, as shown in FIGS. 3A and 3B. The computer system can additionally integrate strip cruise segments into the nominal flight path of the aerial vehicle to increase total scan coverage.

Generally, the aerial vehicle can access and execute a flight path through the array of scan zones within the boundary of the stand of trees prior to returning to the first waypoint of the flight path. In one variation, in response to detecting low onboard battery power, the aerial vehicle can return to the first waypoint point; dock at a power station proximal the first waypoint to recharge; and initiate a next flight path through a next stand of trees.

8. Strip Cruise

In one implementation as shown in FIGS. 3A and 3B, the aerial vehicle can capture a set of color and depth images of trees along a nominally straight strip cruise of the stand of trees while traversing between scan zones (e.g., waypoints of the flight path).

In one variation, the aerial vehicle can capture images of tops of trees while traversing a nominally straight strip cruise above the stand of trees. In this example, the aerial vehicle includes: a first camera mounted to a first side of a lateral axis of the aerial vehicle; a second camera mounted to a second side of the lateral axis of the aerial vehicle opposite the first side; and a third camera mounted to the aerial vehicle between the first camera and the second camera and facing a floor of the stand of trees. The aerial vehicle can then leverage the first camera, the second camera, and the third camera to capture a first sequence of images of treetops within a threshold distance of the first side of the aerial vehicle, to capture a second sequence of images of treetops within the threshold distance of the second side of the aerial vehicle, and to capture a third sequence of images of treetops excluded from the field of view of the first camera and the second camera. Thus, the aerial vehicle can traverse along a nominally straight strip cruise above the canopy of the stand of trees to avoid collisions with obstacles (e.g., trees, shrubs, branches).

In another variation, the aerial vehicle travels along a scan path below the canopy and captures images depicting bases of trees. In this variation, the aerial vehicle includes a fourth camera mounted to the aerial vehicle opposite the third camera and facing tops of the stand of trees. The aerial vehicle can then leverage the first camera, the second camera, and the third camera to capture images of bases of trees and the fourth camera to capture images of tops of trees. The computer system can then detect obstacles in these images. For example, the computer system can: access an overhead image depicting the stand of trees; isolate a region of the overhead image depicting the second scan zone; extract a set of visual features from the region of the overhead image; detect a set of objects (e.g., obstacles, shrubs, trees, leaves) in the second scan zone based on the set of visual features; and, in response to detecting the set of objects within a threshold distance of the second waypoint of the flight path, define a sixth waypoint between the second waypoint and the third waypoint of the flight path; and update the flight path to include the sixth waypoint to avoid collision with the set of objects.

Thus, the aerial vehicle can execute a nominally straight strip cruise below the canopy of the stand of trees and leverage the set of cameras to avoid collision with obstacles (e.g., trees, shrubs, branches) while traversing between scan zones.

8.1 Boustrophedonic Strip Cruise

In one implementation, the computer system can define a boustrophedonic strip cruise for execution by the aerial vehicle above the stand of trees and upload the boustrophedonic strip cruise to the aerial vehicle. In particular, the computer system can: define a first orientation for a first raster leg across (e.g., vertically across) a first scan zone; define a second orientation orthogonal to the first orientation for a second raster leg across (e.g., laterally across) the first scan zone; define a third orientation orthogonal to the second orientation and opposite the first raster leg for a third raster leg across (e.g., vertically across) the first scan zone; and aggregate the first raster leg, the second raster leg, and the third raster leg into a boustrophedonic strip cruise for execution by the aerial vehicle.

In one variation, the aerial vehicle can execute the boustrophedonic strip cruise such that the first pass along the first raster leg and the third pass along the third raster leg overlap. In this variation, the computer system can adjust the second raster leg between the first raster leg and the third raster leg to enable the aerial vehicle to capture images of trees within the first scan zone between the first pass and the second pass.

For example, the aerial vehicle can: access the boustrophedonic strip cruise for the first scan zone; execute a first pass at a first orientation along the first raster leg (e.g., along a nominally straight path parallel and proximal to a first edge of the stand of trees); execute a second pass at a second orientation orthogonal to the first orientation (e.g., a first 90 degree turn) along the second raster leg (e.g., along a nominally straight path orthogonal to the first edge of the stand of trees); and execute a third pass at a third orientation orthogonal to the second orientation (e.g., a second 90 degree turn) and opposite the first raster leg along the third raster leg (e.g., along a nominally straight path parallel and opposite to the first raster leg). The computer system can then access a set of images—depicting tops of trees within the first scan zone—captured by the aerial vehicle while navigating the boustrophedonic strip cruise.

Additionally or alternatively, the computer system can adjust the boustrophedonic strip cruise for the stand of trees to define a gap, containing a set of trees excluded from the strip cruise, between a first scan zone and a second scan zone. For example, the aerial vehicle can access the boustrophedonic strip cruise for the stand of trees; execute a first pass at a first orientation along the first raster leg of a first scan zone; execute a second pass at a second orientation orthogonal to the first orientation along the second raster leg of the set of trees excluded from the strip cruise; and execute a third pass along the third raster leg at a third orientation orthogonal to the second orientation and opposite the first raster leg of the second scan zone. The computer system can then access a set of images—depicting tops of trees within the first scan zone and the second scan zone—captured by the aerial vehicle while navigating the boustrophedonic strip cruise.

Therefore, the computer system can define a boustrophedonic strip cruise for execution by the aerial vehicle to capture images depicting tops of trees within a scan zone and/or to capture images depicting tops of trees within two scan zones.

9. Data Processing

Generally, the computer system can access optical data (e.g., color images and depth images) and non-optical data (e.g., ambient condition data) captured by the aerial vehicle while navigating along the flight path through the stand of trees in real-time during the flight path and/or upon termination of the flight path. The computer system can then manipulate these optical and non-optical data: to derive two-dimensional and/or three-dimensional representations of each scan zone; to assemble these representations into a two-dimensional and/or three-dimensional representation of the stand of trees; to derive correlations between tree characteristics of each scan zone; to interpolate tree characteristics of the stand of trees; and to compile tree characteristics into a virtual representation of tree characteristics across the stand of trees.

In one implementation, the computer system can compile images captured by the aerial vehicle while navigating the flight path through the stand of trees into a composite image of each scan zone and/or compile depth images captured by the aerial vehicle and combine these depth images with the color images to assemble a color three-dimensional representation of each scan zone.

9.1 First Scan Zone: Three-Dimensional Representation

In one implementation, the computer system can compile collected data from a first scan zone with an overhead image to derive correlations between the data collected within the first scan zone by the aerial vehicle below the canopy, and the features depicted in a region of the overhead image representing the first set of trees in the first scan zone.

In one variation, the computer system can access raw two-dimensional images and depth images of the canopy of the first set of trees within the first scan zone captured by aerial vehicle above the first scan zone and stitch these raw two-dimensional images together into a composite two-dimensional image of the canopy for the first scan zone. The computer system can then layer depth images onto the composite two-dimensional image to create a spatial representation of the canopy from an overhead perspective (e.g., tops of the first set of trees). The computer system can similarly stitch raw two-dimensional images of the underside of the canopy captured by the aerial vehicle into a composite two-dimensional image of the canopy from the underside perspective and layer additional depth images to construct a spatial representation of the canopy from an under-canopy perspective. The computer system can then: combine the spatial representation from the overhead perspective and the spatial representation from the under-canopy perspective to construct a spatial representation of the canopy of the first scan zone; and combine the spatial representation with depth images to construct a color three-dimensional representation of the first scan zone. Further, the computer system can layer ambient condition data (i.e., temperature, humidity, light level) onto the three-dimensional representation of the first scan zone.

In another variation, for the first zone, the computer system: compiles the set of color images and depth images collected by the aerial vehicle in the first scan zone from both above and below the canopy to assemble the three-dimensional color representation of: tops of trees; partial gaps extending downwardly from the canopy; sizes of trees facing the gap traversed by the aerial vehicle; partial gaps extending upwardly into the canopy from the underside; and/or tree bases and forest floor near under-canopy paths traversed by the aerial vehicle.

For example, the computer system can: access a first sequence of images representing tops of the first set of trees and captured by the aerial vehicle proximal the first waypoint (e.g., within a threshold distance of the first waypoint); access an intermediate vertical sequence of images representing trunks of the first set of trees and captured by the aerial vehicle while navigating from the first waypoint to the second waypoint (e.g., during the downward vertical traversal); and access a second sequence of images representing bases of the first set of trees and captured by the aerial vehicle proximal the second waypoint at a second altitude near the floor of the first scan zone. The computer system can then assemble the first sequence of images, the second sequence of images, and the intermediate vertical sequence of images into a three-dimensional representation of the first scan zone.

Additionally, the computer system can augment the three-dimensional representation of the first scan zone by annotating the representation with depth images and ambient data (e.g., temperature, humidity, light level) collected by the aerial vehicle during the flight path. For example, the computer system can access a first sequence of depth images representing tops of the first set of trees within the first scan zone; a second sequence of depth images representing bases of the first set of trees; and an intermediate vertical sequence of depth images representing trunks of the first set of trees and captured by the aerial vehicle while navigating along the flight path from the first waypoint to the second waypoint. The computer system can then compile the first sequence of images, the second sequence of images, the intermediate vertical sequence of images, the first sequence of depth images, second sequence of depth images, and the first intermediate vertical sequence of depth images into a color three-dimensional representation of the first scan zone.

Alternatively, the computer system can assemble ambient data into a similar first ambient condition representation for the first scan zone or store ambient data in an ambient data layer in the representation of the first scan zone. The representation of the first scan zone can also define an assembly of a cylinder containing the first scan zone. The computer system can then populate the cylinder with optical data (e.g., depth, and RGB data) collected by the aerial vehicle and store this populated cylinder as a first representation defining a georeferenced three-dimensional point cloud representing trees and tree features of the first set of trees within the first scan zone.

Therefore, the computer system can aggregate images captured by the aerial vehicle to generate a three-dimensional representation of the first scan zone and annotate the three-dimensional representation with depth images and ambient condition data. Additionally, the computer system can augment the spatial representation with an overhead image of the scan zone (e.g., a satellite image, an aerial image) to derive correlations between the overhead image depicting the tops of trees within the scan zone, the sequences of images, and ambient condition data captured by the aerial vehicle below the canopy.

9.2 Virtual Representation of Tree Characteristics

In one implementation, the computer system can access sequences of images captured by the aerial vehicle while navigating along the flight path, extract tree characteristics from these sequences of images, interpolate tree characteristics of trees between scan zones (e.g., trees excluded from the array of scan zones, unscanned trees) and compile these tree characteristics into a virtual representation of tree characteristics across the stand of trees.

In one variation, the computer system can access color images captured by the aerial vehicle representing tops of trees (e.g., above the canopy) and bases of trees (i.e., below the canopy) within each scan zone. The computer system can then leverage tree canopy characteristics and lower tree characteristics detected in these color images to estimate tree characteristics of a set of trees excluded from the array of scan zones.

For example, the computer system can: access a first sequence of images representing tops of a first set of trees within the first scan zone and captured by the aerial vehicle proximal the first waypoint; access a second sequence of images representing bases of the first set of trees and captured by the aerial vehicle proximal the second waypoint; access a third sequence of images representing bases of a second set of trees within the second scan zone and captured by the aerial vehicle proximal the third waypoint; access a fourth sequence of images representing tops of the second set of trees and captured by the aerial vehicle proximal the fourth waypoint; and a fifth sequence of images representing tops of a third set of trees within a third scan zone and captured by the aerial vehicle proximal the fifth waypoint.

The computer system can then: interpolate a first set of tree canopy characteristics of a fourth set of trees between the first scan zone and the second scan zone based on visual features detected in the first sequence of images and the fourth sequence of images; interpolate a first set of lower tree characteristics of the fourth set of trees between the first scan zone and the second scan zone based on visual features detected in the second sequence of images and the third sequence of images; interpolate a second set of tree canopy characteristics of a fifth set of trees between the second scan zone and the third scan zone based on visual features detected in the fourth sequence of images and the fifth sequence of images; and compile the first set of tree canopy characteristics, the first set of lower tree characteristics, and the second set of tree canopy characteristics into a virtual representation of tree characteristics across the stand of trees.

Additionally, the computer system can access color images captured by the aerial vehicle during upward and downward traversals of gaps in the canopy of the stand of trees and representing trunks of trees within each scan zone. The computer system can then estimate tree trunk characteristics of a set of trees between the first scan zone and the second scan zone (e.g., unscanned trees).

For example, the computer system can: access a first intermediate vertical sequence of images representing trunks of the first set of trees within the first scan zone and captured by the aerial vehicle while navigating from the first waypoint to the second waypoint of the flight path; and access a second intermediate vertical sequence of images representing trunks of the second set of trees within the second scan zone captured by the aerial vehicle while navigating from the third waypoint to the fourth waypoint of the flight path. The computer system can then: interpolate a first set of tree trunk characteristics of a set of trees between the first scan zone and the second scan zone (e.g., unscanned trees) based on visual features detected in the first intermediate vertical sequence of images and the second intermediate vertical sequence of images; and compile the first set of tree canopy characteristics, the first set of lower tree characteristics, the first set of tree trunk characteristics, and the second set of tree canopy characteristics into the virtual representation of tree characteristics across the stand of trees.

Alternatively, the computer system can access intermediate horizontal images representing trunks of the set of trees between the first scan zone and the second scan zone and estimate a second set of tree trunk characteristics of the set of trees between the first scan zone and the second scan zone (e.g., unscanned trees) based on visual features detected in these intermediate horizontal images. The computer system can then implement methods and techniques described above to compile the first set of tree canopy characteristics, the first set of lower tree characteristics, the second set of tree trunk characteristics, and the second set of tree canopy characteristics into the virtual representation of tree characteristics across the stand of trees.

Therefore, the computer system can access color images captured by the aerial vehicle while navigating along the flight path to estimate tree characteristics of trees excluded from the array of scan zones (e.g., unscanned trees) and assemble a virtual representation of tree characteristics across the stand of trees.

9.3 Tree Characteristic Modeling

In one implementation, the computer system can extract tree canopy characteristics and lower tree characteristics from images of each scan zone and generate tree characteristic models linking canopy characteristics to lower tree characteristics for each scan zone. The computer system can then leverage the overhead image and these tree characteristic models to assemble the virtual representation of tree characteristics across the stand of trees.

In one variation, the computer system can implement computer vision techniques to identify features in a region of the overhead image representing tops of the first set of trees in the first scan zone. The computer system can then derive correlations between these detected tops of the first set of trees from the overhead image to characteristics of trees extracted from sequences of images captured by the aerial vehicle while navigating along the flight path. The computer system can then extrapolate the correlations to construct the representation.

For example, for the first scan zone, the computer system can: access a first sequence of images representing tops of the first set of trees within the first scan zone; extract a set of tree canopy characteristics of the first set of trees from the first sequence of images; access a second sequence of images representing bases of the first set of trees within the first scan zone; extract a set of lower tree characteristics of the first set of trees from the second sequence of images; and generate a first tree model of the first scan zone linking the set of tree canopy characteristics and the set of lower tree characteristics of the first set of trees.

Then, for the second scan zone, the computer system can: access a third sequence of images representing bases of the second set of trees within the second scan zone; extract a set of lower tree characteristics of the second set of trees from the third sequence of images; access a fourth sequence of images representing tops of the second set of trees within the second scan zone; extract a set of tree canopy characteristics of the second set of trees from the fourth sequence of images; and generate a second tree model of the second scan zone linking the set of lower tree characteristics and the set of tree canopy characteristics of the second set of trees. The computer system can then: access an overhead image depicting the stand of trees; interpolate a set of total tree characteristics of the stand of trees based on visual features detected in the overhead image, the first tree model of the first scan zone, and the second tree model of the second scan zone; and compile the set of total tree characteristics into the virtual representation of tree characteristics across the stand of trees.

In one variation, the computer system can extract tree canopy characteristics and base diameters of trees from images of each scan zone and generate a tree characteristics model linking tree canopy characteristics to base diameters for each scan zone. The computer system can then leverage the overhead image and this tree characteristics model to estimate base diameters of trees excluded from the array of scan zones (e.g., unscanned trees).

For example, for the first scan zone, the computer system can: access a first sequence of images representing tops of the first set of trees within the first scan zone; extract a set of tree canopy characteristics of the first set of trees from the first sequence of images; access a second sequence of images representing bases of the first set of trees within the first scan zone; extract a set of lower tree characteristics of the first set of trees from the second sequence of images; derive a set of base diameters of the first set of trees based on the set of lower tree characteristics; and generate a tree characteristic model of the first scan zone linking the set of tree canopy characteristics and the set of base diameters of the first set of trees. The computer system can then: access an overhead image depicting the stand of trees; isolate a region of the overhead image depicting a set of trees excluded from the array of scan zones; extract a set of visual features of the set of trees from the overhead image; estimate a set of tree base diameters of the set of trees—excluded from the array of scan zones—based on the set of visual features and the tree characteristics model.

Additionally or alternatively, the computer system can generate a tree characteristics model linking tree canopy characteristics to the virtual representation of tree characteristics across the stand of trees and then leverage this model and the overhead image to estimate tree canopy characteristics of a set of trees excluded from the array of scan zones. In this variation, the computer system can: generate a tree characteristics model linking the set of tree canopy characteristics of the first set of trees within the first scan zone and the virtual representation of tree characteristics across the stand of trees; access the overhead image depicting the stand of trees; and interpolate a set of tree canopy characteristics of the set of trees—excluded from the array of scan zones—based on the tree characteristics model and visual features detected in the overhead image; and compile this set of tree canopy characteristics into the virtual representation of tree characteristics across the stand of trees.

Therefore, the computer system can generate tree characteristics models linking canopy tree characteristics and lower tree characteristics and/or base diameters to estimate analogous tree characteristics of trees excluded from the array of scan zones (e.g., unscanned trees). Additionally, the computer system can render the set of tree base diameters of trees for presentation within a user portal, as further described below.

9.4 First Scan Zone: Intrinsic Characteristics

In one implementation, the computer system implements artificial intelligence and/or computer vision techniques to detect characteristics of trees in the first scan zone based on images captured by the aerial vehicle while traversing overhead, vertically through, and around bases of trees in the first scan zone.

In one variation, the computer system can access optical data and implements computer vision techniques, spectral analysis and/or color analysis to identify intrinsic characteristics of the trees in the first zone such as: the location and size of a tree base; the location of a tree top; tree height; canopy geometry; forks in a particular tree; color of tree trunks and branches; foliage color, foliage type (i.e., leave or needle shape and configuration) and foliage density; pests; and forest floor brush density. The computer system can then annotate the first three-dimensional representation with the intrinsic characteristics of trees (and forest floor brush) in the first scan zone. The computer system can also store the intrinsic characteristics of the first scan zone in an intrinsic characteristics layer of the first three-dimensional representation.

Therefore, the computer system can: detect intrinsic characteristics of trees depicted in the set of images collected by the aerial vehicle; annotate the spatial representation of the first scan zone with the intrinsic characteristics; and derive correlations based on the annotated spatial representation to predict other characteristics of trees within the scan zone.

9.5 First Scan Zone: Intra-Zone Characteristic Interpolation

In one implementation, the computer system can implement artificial intelligence, machine learning, and/or regression techniques to derive correlations between data elements such as: lower tree characteristics (e.g., tree base, trunk) and top characteristics to construct a predictive zone model of the first scan zone. Generally, the location of the base of a tree is the anchor for extrapolation or interpolation of other tree characteristics.

In particular, based on data collected by the aerial vehicle and the intrinsic characteristics derived via data analysis, the computer system can extrapolate characteristics of an individual tree from a set of critical intrinsic data points including: tree base location, tree base diameter, and tree height. Based on direct detection of a subset of critical intrinsic data points for a particular tree in the first scan zone, the computer system can extrapolate critical data points for additional trees within and proximal the first scan zone from a single critical intrinsic data point. Further, the computer system can calculate a base-to-height ratio for trees located in the first scan zone based on direct detection of a tree base diameter and a tree height of a tree (i.e., a representative tree) within the scan zone. The computer system can then apply the base-to-height ratio to additional trees within and proximal the first scan zone to predict tree base or tree height based on detection of either a tree base diameter or tree height. Alternatively, the computer system can apply the base-to-height ratio to an average height to calculate average base diameter and vice-versa.

For example, the computer system can: access a first sequence of images representing tops of a first set of trees within the first scan zone and captured by the aerial vehicle proximal the first waypoint; extract a first set of visual features from the first sequence of images; derive a first set of heights of the first set of trees, based on the first set of visual features; access a second sequence of images representing bases of the first set of trees within the first scan zone and captured by the aerial vehicle proximal the second waypoint; extract a second set of visual features from the second sequence of images; derive a first set of base diameters of the first set of trees based on the second set of visual features; and calculate a tree-base-to-height ratio based on a first combination of the first set of heights (e.g., average height of the first set of trees) and a second combination of the first set of diameters (e.g., average base diameter of the first set of trees).

The computer system can then implement methods and techniques described above to estimate tree canopy characteristics and lower tree characteristics of a set of trees between the first scan zone and the second scan zone, excluded from the array of scan zones. The computer system can: apply the tree-base-to-height ratio to the canopy characteristics of the set of unscanned trees; and, in response to the canopy characteristics corresponding to the tree-base-to-height ratio, predict a set of heights of the set of unscanned trees. Similarly, the computer system can: apply the tree-base-to-height ratio to the lower tree characteristics of the set of unscanned trees; and, in response to the lower tree characteristics corresponding to the tree-base-to-height ratio, predict a set of base diameters of the set of unscanned trees.

Additionally, a set of secondary intrinsic data points either directly detected by the aerial vehicle or derived by the computer system via analysis can increase the accuracy of extrapolated data points by the computer system. Secondary intrinsic data points can include: tree health (i.e., absence of pests, abnormal growth, discoloration); species; forks; foliage density; and foliage damage. The computer system can fuse these data with the three-dimensional representation of the first scan zone to generate a virtual representation of the first scan zone.

In one variation, the computer system can identify a treetop within the first scan zone in an image captured by the aerial vehicle, via image analysis. The computer system can then leverage the tree characteristics models and the three-dimensional representation of the first scan zone to predict the tree base location, tree size (base diameter, height), foliage density, and health of a tree within the first scan zone represented in the image by the treetop. The computer system can also identify a base of the tree within the first scan zone in an image captured by the aerial vehicle, via image analysis. The computer system can predict the tree top location, tree size (height), foliage density, and health of the tree represented in the image by the base of the tree. The computer system can identify the base size (diameter) in the image and apply the additional datapoint of base diameter to increase predictive accuracy. The computer system can also identify a side view (i.e., a trunk) of a tree within the first scan zone in an image captured by the aerial vehicle, via image analysis. The computer system can leverage the tree characteristics models and the three-dimensional representation of the first scan zone to predict the base location, tree top location, tree size (height), foliage density, and health of the tree represented in the image by the side view. The computer system can also identify the width (i.e., diameter) of the trunk depicted in the image and apply the additional datapoint of trunk width to increase predictive accuracy.

Therefore, for the first zone, the computer system can access data collected by the aerial vehicle, process and analyze the data to detect all treetops within the first scan zone and leverage the tree characteristics models and the three-dimensional representation of the first scan zone to predict: tree base location associated with each treetop; tree base diameter; tree height; tree health; tree species; foliage density, and other characteristics.

10. Second Scan Zone: Image Aggregation

In one implementation, the computer system can implement methods and techniques described above to assemble a second three-dimensional representation of: treetops; partial gaps extending downwardly from the canopy; sizes of trees facing the gap traversed by the aerial vehicle; partial gaps extending upwardly into the canopy from the underside; and/or tree bases and forest floor near under-canopy paths traversed by the aerial vehicle for the second scan zone.

In one variation, the computer system can: access a first sequence of images representing bases of the second set of trees and captured by the aerial vehicle proximal the third waypoint (e.g., within a threshold distance of the third waypoint) at an altitude near the floor of the second scan zone; access an intermediate vertical sequence of images representing trunks of the second set of trees and captured by the aerial vehicle while navigating from the third waypoint to a fourth waypoint (e.g., during the upward vertical traversal); and access a second sequence of images representing tops of the second set of trees and captured by the aerial vehicle proximal the fourth waypoint at an altitude above the second set of trees. The computer system can then assemble the first sequence of images, the second sequence of images, and the intermediate vertical sequence of images into a three-dimensional representation of the second scan zone.

11. Other Zones

Generally, the computer system can implement methods and techniques described above for each other scan zone in the stand of trees to generate a predictive zone model for each scan zone. Additionally, the computer system can annotate the predictive zone model with intrinsic characteristics particular to the scan zone, and/or annotate with interpolated characteristics derived from adjacent scan zones. In particular, the computer system can annotate the three-dimensional representation of the each scan zone with images and characteristics of individual trees (i.e., "representative trees"), captured by the aerial vehicle.

In one implementation, the computer system can assemble the three-dimensional representation of the first scan zone, the three-dimensional representation of the second scan zone, and the three-dimensional representation of each other scan zone into a three-dimensional representation of the stand of trees. The computer system can then leverage this three-dimensional representation of the stand of trees and tree characteristic models to interpolate canopy characteristics of unscanned trees between scan zones.

For example, the computer system can implement methods and techniques described above to estimate a first set of tree canopy characteristics of a set of unscanned trees between the first scan zone and the second scan zone. The computer system can then: extract a second set of tree canopy characteristics of the first set of trees from images depicting tops of the first set of trees within the first scan zone; extract a third set of tree canopy characteristics from images depicting tops of the second set of trees within the second scan zone; and generate a tree characteristics model linking the first set of tree canopy characteristics, the second set of tree canopy characteristics, the third set of tree canopy characteristics, and the three-dimensional representation of the stand of trees.

The computer system can: isolate a region of the overhead image representing another set of unscanned trees (e.g., excluded from the first scan zone and the second scan zone); extract a set of tree characteristics of this set of unscanned trees from the region of the overhead image; interpolate a fourth set of tree canopy characteristics of this set of unscanned trees based on the tree characteristics model and the set of tree characteristics; and compile the first set of tree canopy characteristics, the second set of tree canopy characteristics, the third set of tree canopy characteristics, and the fourth set of tree canopy characteristics into the virtual representation of tree characteristics across the stand of trees.

Therefore, the computer system can combine three-dimensional representations of each scan zone into a three-dimensional representation of the stand of trees. Additionally, the computer system can leverage tree characteristics models, the overhead image of the stand of trees, and ambient condition data to assemble a virtual representation of tree characteristics across the stand of trees.

12. Strip Modeling

In one implementation, the computer system receives georeferenced data (e.g., tree base locations, tree base sizes, tree color, tree pattern, and foliage density) collected by the aerial vehicle when traversing between a first scan zone and a second zone under the canopy. The aerial vehicle collects data within a strip with a width extending laterally from the left and right sides of the aerial vehicle, perpendicular to the direction of travel of the aerial vehicle and extending in length between the first scan zone and the second scan zone.

The computer system retrieves the georeferenced overhead image (e.g., a low-resolution overhead satellite or aerial image of the stand of trees, an overhead image captured by the aerial vehicle prior to the flight path of the stand of trees) and detects a region of the overhead image corresponding to the strip traversed by the aerial vehicle and extracts visual features from the overhead image. The computer system then derives correlations between these visual features from the region of the overhead image and the data collected by the aerial vehicle during traversal of the strip to create a spatial strip model between the first scan zone and the second scan zone. The computer system can then apply the spatial strip model to derive characteristics of trees (e.g., tree base location, tree height) within the strip based on the visual features (e.g., tops of trees) extracted from the region of the overhead image. Additionally, the computer system can extrapolate the characteristics of trees detected within the overhead image adjacent to the strip by applying the spatial strip model based on tops of trees identified adjacent to the strip within the overhead image.

For example, during the traverse between the first scan zone and the second scan zone, the aerial vehicle captures a first georeferenced image depicting a tree base. The computer system can then: access the image; identify a base location and a base diameter of the tree depicted in the image; access coordinates of the tree base based on the georeferenced image; and access the overhead image of the stand of trees. The computer system can identify the region of the overhead image extending from the first scan zone to the second scan zone based on the georeferenced coordinates of the first scan zone and the second scan zone. The computer system can then isolate visual features proximal the coordinates of the tree base and leverage these coordinates to isolate a corresponding top of the tree. The computer system can repeat this process for additional trees identified within the strip between the first scan zone and the second scan zone.

In one implementation, the computer system can apply a combination of the three-dimensional representation of the first scan zone and the three-dimensional representation of the second scan zone (e.g., a gradient of characteristics between the first scan zone and the second scan zone) to create a theoretical predictive strip representation between the first scan zone and the second scan zone. In one variation, the computer system can validate the theoretical predictive strip representation based on data collected by the aerial vehicle during an under-canopy traversal between the first scan zone and the second scan zone.

Therefore, the computer system can generate a spatial representation of areas between scan zones directly from images and ambient condition data on-the-fly while traversing between scan zones, and/or generate theoretical representations of areas between scan zones by interpolating characteristics between scan zones.

13. Stand Model

In one variation, the computer system can compile the georeferenced representations and full overhead scan into a sparse three-dimensional representation of the stand of trees. The computer system can compile the set of color images and the set of depth images collected by the aerial vehicle, including: the identified treetops and canopy gaps; tree bases from each zone; tree trunks, branches, and foliage from each vertical traversal completed in each scan zone; and the treetops identified in the full overhead image; to construct a spatial representation of the stand of trees limited to the data collected by the aerial vehicle and the features depicted in the full overhead image. The computer system can then implement artificial intelligence, machine learning, and/or computer vision techniques to derive correlations between data elements and generate a predictive stand model from the data collected by the aerial vehicle. The computer system can leverage the predictive stand model to predict characteristics of trees (e.g., base width, height) based on the features detected in the full overhead image, such as treetops. The computer system can then apply the predictive stand model to interpolate tree characteristics and augment the gaps in the sparse three-dimensional representation of the stand of trees to generate a synthetic three-dimensional representation of the stand of trees.

In one implementation, the computer system can detect individual treetops in the full overhead scan. For each detected treetop, the computer system can implement the synthetic spatial representation to predict: the tree base location; the tree base diameter; and the tree height. Additionally, the computer system can predict secondary information such as: tree species, foliage density, health, and probability of forks within the tree. The computer system can predict tree characteristics based on the full overhead scan with varying degrees of confidence, based on the proximity of the detected feature (i.e., treetop) to a scan zone.

For example, the sparse three-dimensional representation of the stand of trees includes descriptive data of individual trees and intrinsic data collected by the aerial vehicle. The computer system can apply the predictive model to extrapolate tree characteristics across the stand of trees, generating the synthetic spatial representation. As shown in FIG. 3A, the synthetic spatial representation exhibits higher predictive confidence within the area of the scan zones 1-9 and lower predictive confidence in unscanned areas of the stand of trees (i.e., interpolation areas I1-I4.)

In one variation, the aerial vehicle can complete a series of strip cruise scans and the computer system can apply the predictive strip model to the strip cruising sections (FIG. 3A, traversals T1-T8) exhibiting a medial predictive confidence (e.g., between the predictive confidence of the scan zones and interpolation areas) within the synthetic spatial representation.

In another variation, the computer system represents the predictive confidence as a gradient, with the highest confidence at the location of a scan zone (or an individually scanned, or "representative" tree) and the lowest confidence at the centroid of adjacent scan zones.

For example, the computer system can access an overhead image of the stand of trees and virtually overlay the synthetic spatial representation based on georeferenced coordinates. The computer system can then access a count of trees in each scan zone (e.g., a quantity of trees) and match the count to the count of treetops depicted in each zone in the overhead image exhibiting a match percentage greater than a threshold match percentage (e.g., 92%), resulting in a high model predictive confidence within the scan zones. The computer system can complete similar steps for each strip traversed between each zone, with a lower match success percentage, resulting in a lower model predictive confidence within the strips. The computer system can then calculate a count of trees in the unscanned areas of the tree stand (FIG. 3A, I1-I4) based on the treetops depicted in the overhead image with no match percentage (as there is no collected data to match to), resulting in a lower model predictive confidence than the model predictive confidence within a strip. The computer system can also extrapolate tree characteristics such as height, base size, and timber volume via the synthetic spatial representation within each scan zone and strip with similar confidence levels. The computer system can extrapolate tree characteristics of each treetop detected in the overhead image based on the best available model data. In particular, the computer system can predict tree characteristics of individual trees within a segment of an overhead image representing a scan zone based on treetops detected in the segment of the image and derive correlations to the set of images collected within the scan zone; or based on the closest representative tree. Additionally, the computer system can predict tree characteristics corresponding to individual trees detected in regions of the overhead image depicting areas outside a scan zone by extrapolating tree characteristics of the closest scan zone or representative tree, or extrapolating a gradient of characteristic values between a first scan zone including a first set of tree characteristics, and a second scan zone including a second set of tree characteristics.

Further, the computer system can layer additional detected or derived information about the stand of trees into the predictive stand model such as: pest infestation or disease, density of trees, species distribution, fire risk, ease of access based on terrain condition, and others.

Therefore, the computer system can construct a representative synthetic spatial representation of the stand of trees to predict characteristics of trees within the stand with varying confidence levels based on an individual tree's proximity to a scan zone.

14. Metrics

Generally, the computer system can extract a set of metrics from the three-dimensional representation of the stand of trees including: tree count, species, timber volume, and health metrics of the stand of trees. In particular, the computer system can extract a gross tree count from the three-dimensional representation of the stand of trees and segment the count into metric categories such as healthy mature trees, healthy immature trees, unhealthy trees, harvest-ready trees, etc.

Furthermore, the computer system can segment the tree count by tree species using secondary data in the synthetic three-dimensional representation of the stand of trees to produce a species histogram and thereby, enable a stand manager or owner to visualize the timber content of the stand of trees. The computer system can also calculate additional metrics from the images and non-optical data collected by the aerial vehicle and the three-dimensional representation including board feet of a particular species of timber, or carbon capture and/or sequestration values of the stand of trees, based on the count, age, and size of trees present in the stand.

In one implementation, the computer system can identify a particular tree species within a first scan zone within the stand model by extracting from the stand model (i.e., from the set of images captured by the aerial vehicle) a set of characteristics of the particular tree within the first scan zone. The computer system then accesses a set of template characteristics associated with a tree type and computer vision techniques (e.g., template matching) to match the detected features of the particular tree to a set of template characteristics associated with a tree type. In response to the detected characteristics of the particular tree matching the template characteristics within a matching threshold, the computer system assigns the particular tree the tree type associated with the template characteristics. The computer system can apply the same methods to assign tree types to particular trees across the stand model. The computer system can then interpolate tree types for other trees within the stand model not directly detected by the aerial vehicle to further complete the stand model.

In another implementation, the computer system can construct an audit tool: defining or linked to a database and a user interface; configured to interpret data contained in the three-dimensional representation of the stand of trees and configured to render this representation—annotated with metrics—within a user portal. The computer system can aggregate data collected from a scan zone of a stand of trees and/or scan data collected from the array of scan zones of the stand of trees to augment or enhance the three-dimensional representation of the stand of trees.

In one variation, the computer system can access an initial set of images representing tops of the stand of trees captured by the aerial vehicle and compile these images into a composite aerial image depicting the stand of trees, the composite image characterized by a first resolution (e.g., low-resolution overhead image). The computer system can then access a set of ground images captured by the aerial vehicle and characterized by a second resolution greater than the first resolution (e.g., high-resolution images representing bases of the stand of trees). In this variation, the computer system can transform visual features extracted from these ground images and the overhead image into a map of the stand of trees for presentation to a user.

For example, the computer system can: compile the set of ground images—representing bases of the stand of trees—and visual features extracted from these ground images and the overhead image of the stand of trees into a map of the stand of trees; annotate the map of the stand of trees with values of a metric for a first set of trees depicted in the set of ground images; annotate the map of the stand of trees with values of the metric for a second set of trees depicted in the overhead image; compile values of the metric, for the first set of trees and the second set of trees, within the map of the stand of trees into a composite value of the metric; and render the map of the stand of trees within the user portal.

14.1 Composite Value+Metric Function

Generally, the computer system can implement computer vision techniques (e.g., object detection, edge detection, template matching) to detect visual features (e.g., bark characteristics, pixel width, foliage characteristics) of each tree depicted in a high-resolution ground image and characterize a value of a metric associated with these visual features such as: tree type; tree species; pest risk; base diameter; fire risk; defects; carbon capture; etc. The computer system can then generate a metric function representing a correlation between values of this metric and these visual features and leverage the metric function to characterize a value of the metric of each tree depicted in the low-resolution overhead image of the stand of trees.

In one implementation, the computer system can: access a set of ground images representing bases of the stand of trees and captured by an aerial vehicle; and isolate a first set of trees depicted in the set of ground images. Then, for each tree in the first set of trees, the computer system can: detect a first region of the set of ground images depicting the tree; extract a first set of visual features from the first region of the set of ground images; characterize a value of a metric of the tree based on the first set of visual features; detect a second region of the overhead image depicting the tree; extract a second set of visual features from the second region of the overhead image; and store the value of the metric and the second set of visual features in a container in a set of containers. The computer system can then: generate a metric function representing a correlation between values of the metric and visual features within the stand of trees based on the set of containers.

Furthermore, the computer system can: access an overhead image depicting the stand of trees; and isolate a second set of trees, excluded from the set of ground images, depicted in the overhead image. Then, for each tree in the second set of trees, the computer system can: detect a third region of the overhead image depicting the tree; extract a third set of visual features from the third region of the overhead image; and characterize a second value of the metric of the tree based on the third set of visual features. The computer system can then compile values of the metric, for the first set of trees and the second set of trees, into a composite value of the metric for the stand of trees. The computer system can further present the composite value of the metric for the stand of trees within a user portal for review by a stand manager and/or owner of the stand of trees.

Therefore, the computer system can extract raw metrics corresponding to the stand of trees collected by the aerial vehicle, extrapolate additional metrics describing characteristics of the stand of trees and assign these additional metrics to individual trees. The computer system can then interpolate characteristics of other unscanned trees within the stand model to predict additional characteristics of the stand of trees within the stand model. Additionally, the computer system can assemble the raw and derived metrics into a comprehensive data set representing the stand of trees and annotate the three-dimensional representation of the stand of trees with the comprehensive data set to enable the owner or stand manager to execute management decisions regarding the stand of trees such as harvest times, pest mitigation strategies, fire risk mitigation, etc.

14.1.1 Overhead Image+Confidence Scores

In one variation, the computer system can implement machine learning and regression techniques to represent the metric function as a linear regression between values of the metric and visual features of the stand of trees. In this variation, the computer system can leverage the set of containers and the linear regression to generate a confidence function to calculate confidence scores of trees depicted in the low-resolution overhead image.

For example, the computer system can: extract an error value from the linear regression representing the relationship between values of the metric and visual features of the stand of trees. The computer system can: derive a second correlation between the error value of the linear regression and visual features of the first set of trees; and generate a confidence function representing the second correlation. Then, for each tree in the second set of trees, depicted in a region of the overhead image, the computer system can: estimate error of the value of the metric based on the confidence function and the visual features of the second set of trees; and represent error of the value as a confidence score. The computer system can then generate a visual representation of confidence scores for the second set of trees and further annotate the composite value of the metric for the stand of trees with the virtual representation of confidence scores for the second set of trees.

Furthermore, the computer system can: isolate a confidence score (e.g., 65%) of a particular tree—depicted in the low-resolution overhead image—within the virtual representation of confidence scores; and, in response to the confidence score (e.g., 65%) falling below a threshold confidence score (e.g., 80%), generate a prompt for the aerial vehicle to capture high-resolution ground images of this particular tree and/or a set of trees proximal to this particular tree and represented in the low-resolution overhead image. The computer system can access ground images representing bases of this set of trees, isolate the set of trees, and then implement methods and techniques described above to represent errors of the value of the metric of each tree with an updated confidence score (e.g., 83%). The computer system can then: populate the virtual representation with updated confidence scores for this set of trees; annotate the composite value of the metric for the stand of trees with the virtual representation of updated confidence scores; and render the composite value of the metric for the stand of trees for presentation within the user portal.

Additionally or alternatively, the computer system can transform the virtual representation of confidence scores into a tolerance interval for base diameters of trees depicted in the low-resolution overhead image of the stand of trees. The computer system can then annotate the composite value of the base diameter for the stand of trees with the tolerance interval for base diameters.

Therefore, the computer system can leverage the linear regression to construct a confidence function to calculate confidence scores of trees. The computer system can monitor confidence scores of trees depicted in the low-resolution overhead image and send the aerial vehicle to capture high-resolution ground images of a tree exhibiting a confidence score less than a threshold confidence score. The computer system can further calculate an updated confidence score of the tree proportional to the resolution of the ground image depicting the tree, as described below.

14.1.2 Ground Images+Confidence Scores

In another variation, the computer system can: assign confidence scores to each tree depicted in the high-resolution set of ground images proportional to the resolution of the image depicting each tree; and further represent these confidence scores in the virtual representation.

For example, for each tree in the first set of trees, depicted in the set of ground images, the computer system can: calculate a confidence score (e.g., 90%) of the value of metric of the tree proportional to a resolution (e.g., high-resolution) of the first region of the set of ground images depicting the tree; and store the confidence score, the value of the metric, and the second set of visual features in the container, in the set of containers. The computer system can then: populate the virtual representation of confidence scores with confidence scores of the first set of trees; and annotate the composite value of the metric for the stand of trees with this updated virtual representation of confidence scores.

14.2 Metric Variation: Base Diameter of Trees

In one variation, the computer system can detect visual features representing a base boundary of a base of each tree depicted in a high-resolution ground image and leverage these base boundaries to characterize a base diameter of each tree. The computer system can then generate a metric function linking base diameters and base boundaries of trees to characterize a base diameter of each tree depicted in the low-resolution overhead image of the stand of trees.

For example, the computer system can: identify a ground image depicting a particular tree; detect a base boundary of a base of the particular tree in the ground image; and characterize a base diameter of the particular tree based on the base boundary of the particular tree. The computer system can then: detect a canopy of the particular tree in a region of the overhead image; extract a particular set of visual features from the particular region of the overhead image; store the base diameter as a particular value of the metric in a container associated with the particular tree; and represent the particular set of visual features in the container.

Additionally or alternatively, the computer system can access a set of high-resolution, two-dimensional color images representing bases of the stand of trees captured by the suite of optical sensors mounted the aerial vehicle. The computer system can then detect visual features within each color image representing a pixel width of the base of each tree and leverage these pixel widths to characterize a base diameter of each tree. The computer system can similarly generate a metric function linking base diameters and pixel widths of trees to characterize a base diameter of each tree depicted in the low-resolution overhead image of the stand of trees.

For example, the computer system can: access a set of color images representing bases of the stand of trees and captured by the aerial vehicle proximal a floor of the stand of trees; identify a color image, in the set of color images, depicting a base of the particular tree; extract a pixel width of the base of the particular tree in the color image; and transform the pixel width into a base diameter of the particular tree. The computer system can then: detect a canopy of the particular tree in a region of the overhead image; extract a particular set of visual features from the region of the overhead image; store the base diameter as a particular value of the metric in a container associated with the particular tree; and represent the particular set of visual features in the container.

Furthermore, the computer system can implement methods and techniques described above to estimate error of each base diameter metric and represent these errors as confidence values in a visual representation of confidence scores for the stand of trees. The computer system can further annotate the composite value of base diameters for the stand of trees with the virtual representation of confidence scores and present the annotated composite value of base diameters for the stand of trees within the user portal for review by the user (e.g., stand manager, owner), as further described below.

14.3 Metric Variation: Tree Type+Foliage Characteristics

In one variation, the computer system can detect visual features representing foliage characteristics of a particular tree from a ground image captured by the aerial vehicle and leverage these foliage characteristics to identify the tree type and characterize a value of the tree type of the particular tree.

For example, the computer system can: identify an image, in the set of ground images, depicting a particular tree; extract a particular set of foliage characteristics (e.g., lance-shaped leaves) of the particular tree in the image; access a set of nominal foliage characteristics associated with a tree type (e.g., lance-shaped leaves associated with a pine tree); and, in response to identifying the particular set of foliage characteristics analogous to the set of nominal foliage characteristics, characterize a particular value representing the tree type (e.g., pine tree) of the particular tree. The computer system can then extract a secondary set of foliage characteristics (e.g., needle-shaped leaves) from a particular region of the overhead image; calculate a particular confidence score of the particular value representing the tree type of the particular tree proportional to the resolution of the particular image; store the particular confidence score of the particular value representing the tree type in a container associated with the particular tree; and represent the secondary set of foliage characteristics (e.g., needle-shaped leaves) in the container. The computer system can then generate a virtual representation of confidence scores representing tree types of trees depicted in the set of ground images; and compile values of the metric into the composite value for the stand of trees annotated with the virtual representation of confidence scores representing tree types for these trees.

Therefore, the computer system can leverage foliage characteristics from high-resolution ground images and secondary foliage characteristics from the low-resolution overhead image to identify a tree type of each tree in the stand of trees, to assign a confidence score to each tree type, and to generate a virtual representation of confidence scores for the stand of trees.

14.4 Metric Variation: Bark Characteristics

In one variation, the computer system can identify a particular tree within a first scan zone within the three-dimensional representation of the stand of trees and extract the set of ground images captured by the aerial vehicle from the three-dimensional representation of the stand of trees. The computer system can then detect a set of visual features representing bark characteristics of a particular tree within the first scan zone. The computer system can leverage the tree type of the tree to access a set of nominal (e.g., baseline) bark characteristics for the particular tree. The computer system can then identify a difference between the visual features and the nominal set of bark characteristics to characterize a pest risk value of the particular tree.

For example, the computer system can: identify an image, in the set of ground images, depicting a particular tree; extract a particular set of bark characteristics of the particular tree from the image; access a set of nominal bark characteristics of the particular tree; characterize a difference between the particular set of bark characteristics and the set of nominal bark characteristics of the particular tree; and characterize a pest presence value of the particular tree based on the difference between the particular set of bark characteristics and the set of nominal bark characteristics of the particular tree. The computer system can then: detect a canopy of the particular tree in a region of the overhead image; extract a particular set of visual features from the region of the overhead image; store the pest presence value as a particular value of the metric in a container associated with the particular tree; and represent the particular set of visual features in the container. Then, based on the container, the computer system can: calculate a particular confidence score of the pest presence value of the particular tree proportional to a resolution of the image depicting the particular tree; and, in response to the particular confidence score exceeding a threshold confidence score, generate a virtual representation of pest presence value for the particular tree. The computer system can then: compile the composite value of the metric for the stand of trees, the virtual representation of the pest presence value for the particular tree, and the image, in the set of ground images, into a report for the stand of trees; and render the report for the stand of trees for presentation within a user portal.

The computer system can repeat the foregoing methods and techniques for other trees in the scan zone or trees in other scan zones, to predict pest risk values of these other trees. The computer system can further aggregate the pest risk values of individual trees within a scan zone to generate a pest risk value of the scan zone, and/or aggregate pest risk values across the three-dimensional representation of the stand model to predict areas of pest risk. The computer system can also identify other extrapolated metrics from the three-dimensional representation of the stand of trees such as fire risk, disease or blight, timber quality (e.g., rotten trees, damaged trees), carbon capture, etc.

15. Audit Tool

In one implementation, the computer system can present metrics selected by the user from the aggregated scan data within the user portal. These metrics can include: total tree count; tree count by species; volume of timber; board feet of timber; pest presence/severity/location; healthy tree percentage; and carbon capture potential. The computer system can segment the three-dimensional representation of the stand of trees into a set of layers describing a metric of the stand of trees such as harvest times and harvest locations for zones within the stand of trees, growth metrics and predictions, yield metrics and predictions, species count, tree damage and/or loss, pest presence, fire risk, and/or carbon capture and sequestration metrics.

Additionally, the computer system can present an image of a representative tree captured by the aerial vehicle during a scan of the stand of trees. The computer system can receive annotations from the user representing bark conditions indicating pests, tree species, tree damage, or favorable growth characteristics displayed in the image depicting the representative tree. The computer system can then apply the received user input to the stand model to improve the accuracy of predictions or derived correlations completed by the predictive stand model.

For example, at the conclusion of a flight path through the stand of trees, a user accesses the user interface (e.g., user portal) and reviews metrics of the stand of trees. The computer system can present a map of the stand of trees denoting detected treetops, and a table indicating metrics within a section of the stand of trees within the user portal. The computer system also presents overhead images of the stand of trees and virtually overlays non-optical data to indicate individual trees, scan zones, and other tree characteristics. In one variation, the computer system can also present an annotated image depicting a representative tree within the scan zone. The user can then inspect the annotated image and verify the tree species and tree condition and validate the accuracy of the predictive stand model.

In another variation, the computer system can present a real-time image of a representative tree captured by the aerial vehicle during execution of the flight path. The computer system can enrich the real-time image by annotating the image with data from the predictive stand model and present the enriched representative image with annotations to the user within the user portal. The user can evaluate and verify the correlations derived by the predictive stand model within the user portal to improve the predictive stand model accuracy in real time.

Therefore, the computer system can present the annotated predictive stand model to a user in a user-readable format within the user portal and receive input from the user to verify the accuracy of model predictions executed by the computer system to characterize the stand of trees. The computer system can then present data representing the stand of trees to a user (e.g., an owner or manager of the stand of trees), receive input from the user to verify the model accuracy, and generate and transmit prompts to the user to select a stand management action, and/or produce a management report describing current and projected states of the stand of trees based on the predictive stand model.

15.1 Confidence Score Filter

In one variation, the user may want to review a particular metric of trees characterized by a confidence score within a confidence score range within the user portal. The user can interface with the user portal to define a confidence score filter for the values of the metric.

For example, the computer system can render the composite value for the stand of trees for presentation within a user portal and, in response to receiving selection of a confidence score range (e.g., between 75% and 85%) for a set of trees—depicted in the low-resolution overhead image—at the user portal from a user: isolate confidence scores of this set of trees falling within the confidence score range (e.g., between 75% and 85%); and generate a second virtual representation of these confidence scores for the set of trees. The computer system can then: annotate the composite value of the metric for the stand of trees with the second virtual representation of confidence scores for this set of trees; and present the composite value of the metric for the stand of trees, annotated with the second virtual representation of confidence scores for the set of trees, within the user portal for the user to review.

Therefore, the user can interface with the user portal and the computer system can apply a confidence score filter to trees exhibiting a metric of interest to the user to enable the user to review trees within a confidence score range.

15.2 Management Report

In one variation, the computer system can present a management report of the stand of trees to the user within the user portal. The management report can include the composite value of a metric of interest to the user, a virtual representation of confidence scores, and high-resolution ground images representing bases of trees associated with the metric.

For example, the user may select a base diameter metric within the user portal. The computer system can then implement methods and techniques described above to calculate a confidence score of a base diameter of a particular tree proportional to a resolution of the ground image depicting the tree; generate a virtual representation of the confidence score for the particular tree; compile the composite value of the metric for the stand of trees, the virtual representation of this confidence score for the particular tree, and the ground image depicting the particular tree, into a management report for the stand of trees; and present this management report within the user portal to the user.

Furthermore, the user may select a base diameter heatmap for the stand of trees within the user portal. The computer system can then: extract a value of the metric (e.g., base diameter) of the particular tree from a container associated with the particular tree and, in response to the base diameter falling within a target base diameter range, assign a first color value to the base diameter of the particular tree. The computer system can repeat this process for each other base diameter of each other tree. The computer system can then generate a heatmap of base diameters for the stand of trees populated with the color value representing the base diameter of the particular tree; and render the heatmap of base diameters for the stand of trees within the user portal.

Additionally or alternatively, the user may select a histogram of tree quantities for the stand of trees within the user portal. The computer system can then: isolate a first set of trees depicted in the set of ground images; detect a first tree quantity of the first set of trees; isolate a second set of trees depicted in the overhead image; detect a second tree quantity of the second set of trees; and calculate a total tree quantity of the stand of trees based on a combination of the first tree quantity and the second tree quantity. The computer system can then implement methods and techniques described above to identify a first subset of trees exhibiting base diameters within a first discrete base diameter range (e.g., between 12 inches and 14 inches); and identify a second subset of trees exhibiting base diameters within a second discrete base diameter range (e.g., between 14 inches and 19 inches); and aggregate the total tree quantity and base diameters of the first subset of trees and the second subset of trees into a histogram of tree quantities for the stand of trees.

Therefore, the computer system can present metrics of the stand of trees as a management report, as a heatmap of base diameters, and/or as a histogram of tree quantities for review by the user within the user portal.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
  accessing a boundary of a stand of trees;
  defining an array of scan zones within the boundary of the stand of trees;
  defining a flight path comprising:
    a first waypoint at a first altitude above a first set of trees within a first scan zone;
    a second waypoint at a second altitude proximal a first floor within the first scan zone;
    a third waypoint at a third altitude proximal a second floor within a second scan zone;
    a fourth waypoint at a fourth altitude above a second set of trees within the second scan zone; and
    a fifth waypoint at a fifth altitude above a third set of trees within a third scan zone;
  accessing a first set of images comprising:
    a first sequence of images representing tops of the first set of trees and captured by an aerial vehicle proximal the first waypoint;
    a second sequence of images representing bases of the first set of trees and captured by the aerial vehicle proximal the second waypoint;
    a third sequence of images representing bases of the second set of trees and captured by the aerial vehicle proximal the third waypoint;
    a fourth sequence of images representing tops of the second set of trees and captured by the aerial vehicle proximal the fourth waypoint; and
    a fifth sequence of images representing tops of the third set of trees and captured by the aerial vehicle proximal the fifth waypoint;
  interpolating a first set of tree canopy characteristics of a fourth set of trees between the first scan zone and the second scan zone based on visual features detected in the first sequence of images and the fourth sequence of images;
  interpolating a first set of lower tree characteristics of the fourth set of trees between the first scan zone and the second scan zone based on visual features detected in the second sequence of images and the third sequence of images;
  interpolating a second set of tree canopy characteristics of a fifth set of trees between the second scan zone and the third scan zone based on visual features detected in the fourth sequence of images and the fifth sequence of images; and
  compiling the first set of tree canopy characteristics, the first set of lower tree characteristics, and the second set of tree canopy characteristics into a virtual representation of tree characteristics across the stand of trees.

2. The method of claim 1:
further comprising:
  deploying the aerial vehicle to capture images while traversing the flight path;
  accessing a first intermediate vertical sequence of images representing trunks of the first set of trees and captured by the aerial vehicle while navigating from the first waypoint to the second waypoint;
  accessing a second intermediate horizontal sequence of images captured by the aerial vehicle while navigating from the second waypoint to the third waypoint;
  accessing a third intermediate vertical sequence of images representing trunks of the second set of trees captured by the aerial vehicle while navigating from the third waypoint to the fourth waypoint;
  accessing a fourth intermediate horizontal sequence of images captured by the aerial vehicle while navigating from the fourth waypoint to the fifth waypoint; and
  interpolating a first set of tree trunk characteristics of the fourth set of trees between the first scan zone and the second scan zone based on visual features detected in the first intermediate vertical sequence of images and the third intermediate vertical sequence of images; and
wherein compiling the first set of tree canopy characteristics comprises compiling the first set of tree canopy characteristics, the first set of lower tree characteristics, the first set of tree trunk characteristics, and the second set of tree canopy characteristics into the virtual representation of tree characteristics across the stand of trees.

3. The method of claim 1:
further comprising:
  accessing an overhead image depicting the stand of trees; and
  overlaying the boundary of the stand of trees onto the overhead image; and
wherein defining the array of scan zones within the boundary of the stand of trees comprises projecting a two-dimensional grid array of scan zones onto the overhead image, each scan zone in the array of scan zones:
  defining a minimum diameter within a target diameter range;
  defining a lateral pitch distance:
    greater than the minimum diameter; and
    less than a maximum width of the boundary of the stand of trees; and
  defining a longitudinal pitch distance:
    greater than the minimum diameter; and
    less than a maximum length of the boundary of the stand of trees.

4. The method of claim 3:
wherein accessing the overhead image depicting the stand of trees comprises:
  deploying the aerial vehicle to capture images of the stand of trees at a sixth altitude greater than the first altitude above the stand of trees;
  accessing an initial sequence of images representing tops of the stand of trees, the initial sequence of images characterized by an initial resolution, and captured by the aerial vehicle; and
  compiling the initial sequence of images into a composite overhead image of the stand of trees characterized by the initial resolution; and
wherein accessing the first set of images comprises accessing the first set of images characterized by a first resolution greater than the initial resolution.

5. The method of claim 1:
further comprising:

extracting a first set of visual features from the first sequence of images;
deriving a first set of heights of the first set of trees, based on the first set of visual features;
extracting a second set of visual features from the second sequence of images;
deriving a first set of base diameters of the first set of trees based on the second set of visual features; and
calculating a tree-base-to-height ratio based on a first combination of the first set of heights and a second combination of the first set of diameters;
wherein interpolating a first set of tree canopy characteristics of the fourth set of trees between the first scan zone and the second scan zone comprises:
applying the tree-base-to-height ratio to the first set of canopy characteristics of the fourth set of trees; and
in response to the first set of canopy characteristics corresponding to the tree-base-to-height ratio, predicting a second set of heights of the fourth set of trees; and
wherein interpolating a first set of lower tree characteristics of the fourth set of trees between the first scan zone and the second scan zone comprises:
applying the tree-base-to-height ratio to the first set of lower tree characteristics of the fourth set of trees; and
in response to the first set of lower tree characteristics corresponding to the tree-base-to-height ratio, predicting a second set of base diameters of the fourth set of trees.

6. The method of claim 1:
further comprising:
defining a first orientation for a first raster leg across the first scan zone;
defining a second orientation orthogonal to the first orientation for a second raster leg across the first scan zone;
defining a third orientation orthogonal to the second orientation and opposite the first raster leg for a third raster leg across the first scan zone; and
aggregating the first raster leg, the second raster leg, and the third raster leg into a boustrophedonic strip cruise for execution by the aerial vehicle; and
wherein accessing the first set of images comprises accessing the first set of images captured by the aerial vehicle while navigating the boustrophedonic strip cruise.

7. The method of claim 1:
further comprising:
extracting a third set of tree canopy characteristics of the first set of trees from the first sequence of images;
extracting a second set of lower tree characteristics of the first set of trees from the second sequence of images;
generating a first tree model of the first scan zone linking the third set of tree canopy characteristics and the second set of lower tree characteristics of the first set of trees;
extracting a third set of lower tree characteristics of the second set of trees from the third sequence of images;
extracting a fourth set of tree canopy characteristics of the second set of trees from the fourth sequence of images;
generating a second tree model of the second scan zone linking the third set of lower tree characteristics and the fourth set of tree canopy characteristics of the second set of trees;
accessing an overhead image depicting the stand of trees; and
interpolating a set of total tree characteristics of the stand of trees based on visual features detected in the overhead image, the first tree model of the first scan zone, and the second tree model of the second scan zone; and
wherein compiling the first set of tree canopy characteristics, the first set of lower tree characteristics, and the second set of tree canopy characteristics into the virtual representation comprises compiling the set of total tree characteristics into the virtual representation of tree characteristics across the stand of trees.

8. The method of claim 1:
further comprising:
accessing an overhead image depicting the stand of trees;
extracting a first set of visual features from a first region of the overhead image representing tree characteristics of the first set of trees;
extracting a second set of visual features from a second region above the first region of the overhead image representing tree characteristics of the second set of trees; and
characterizing a first difference between the first set of visual features and the second set of visual features; and
wherein defining the array of scan zones within the boundary of the stand of trees comprises in response to the first difference between the first set of features and the second set of features exceeding a difference threshold:
projecting the first scan zone, in the array of scan zones, onto the first region of the overhead image to encompass the first set of trees; and
projecting the second scan zone, in the array of scan zones, onto the second region of the overhead image to encompass the second set of trees.

9. The method of claim 1:
further comprising:
accessing a first intermediate vertical sequence of images representing trunks of the first set of trees and captured by the aerial vehicle while navigating along the flight path from the first waypoint to the second waypoint;
assembling the first sequence of images, the second sequence of images, and the first intermediate vertical sequence of images into a first three-dimensional representation of the first scan zone;
accessing a second intermediate vertical sequence of images representing trunks of the second set of trees captured by the aerial vehicle while navigating along the flight path from the third waypoint to the fourth waypoint; and
assembling the third sequence of images, the fourth sequence of images, and the second intermediate vertical sequence of images into a second three-dimensional representation of the second scan zone; and
wherein compiling the first set of tree canopy characteristics, the first set of lower tree characteristics, and the second set of tree canopy characteristics into the virtual representation comprises assembling the first three-dimensional representation of the first scan zone and the second three-dimensional representation of the second scan zone into a third three-dimensional representation of the stand of trees.

10. The method of claim 9, further comprising:
extracting a third set of tree canopy characteristics of the first set of trees from the third three-dimensional representation of the stand of trees;
accessing a set of target tree canopy characteristics associated with a tree type;
in response to the third set of tree canopy characteristics corresponding to the set of target tree canopy characteristics, annotating the first set of trees with the tree type within the third three-dimensional representation of the stand of trees; and
interpolating a tree type of the stand of trees based on the third three-dimensional representation of the stand of trees.

11. The method of claim 9:
further comprising, accessing a first set of depth images comprising:
  a first sequence of depth images representing tops of the first set of trees and captured by the aerial vehicle proximal the first waypoint;
  a second sequence of depth images representing bases of the first set of trees and captured by the aerial vehicle proximal the second waypoint; and
  a first intermediate vertical sequence of depth images representing trunks of the first set of trees and captured by the aerial vehicle while navigating along the flight path from the first waypoint to the second waypoint; and
wherein assembling the first three-dimensional representation of the first scan zone comprises compiling the first sequence of images, the second sequence of images, the first intermediate vertical sequence of images, the first sequence of depth images, second sequence of depth images, and the first intermediate vertical sequence of depth images into a color three-dimensional representation of the first scan zone.

12. The method of claim 1, further comprising:
extracting a third set of tree canopy characteristics of the first set of trees from the first sequence of images;
deriving a first set of tree base diameters based on visual features detected in the second sequence of images;
generating a tree characteristics model linking the third set of tree canopy characteristics to the first set of tree base diameters;
accessing an overhead image depicting the stand of trees;
isolating a region of the overhead image, the region depicting a sixth set of trees excluded from the array of scan zones;
extracting a set of visual features of the sixth set of trees from the overhead image;
estimating a second set of tree base diameters of the sixth set of trees based on the set of visual features and the tree characteristics model; and
rendering the first set of tree base diameters of the first set of trees and the second set of tree base diameters of the sixth set of trees, excluded from the array of scan zones, for presentation within a user portal.

13. The method of claim 12:
wherein generating the tree characteristics model comprises linking the third set of tree canopy characteristics and the virtual representation of tree characteristics across the stand of trees;
further comprising interpolating a fourth set of tree canopy characteristics of the sixth set of trees based on the tree characteristics model and the set of visual features; and
wherein compiling the first set of tree canopy characteristics, the first set of lower tree characteristics, and the second set of tree canopy characteristics into the virtual representation comprises compiling the first set of tree canopy characteristics, the first set of lower tree characteristics, the second set of tree canopy characteristics, the third set of tree canopy characteristics, and the fourth set of tree canopy characteristics into the virtual representation of tree characteristics across the stand of trees.

14. The method of claim 12:
further comprising:
  deploying the aerial vehicle to capture images of the stand of trees at a sixth altitude greater than the first altitude above the stand of trees;
  accessing an initial sequence of images representing tops of the stand of trees and captured by the aerial vehicle; and
  compiling the initial sequence of images into a composite overhead image of the stand of trees; and
wherein accessing the overhead image depicting the stand of trees comprises accessing the composite overhead image of the stand of trees.

15. The method of claim 1:
further comprising:
  accessing an overhead image depicting the stand of trees;
  isolating a region of the overhead image depicting the second scan zone;
  extracting a set of visual features from the region of the overhead image;
  detecting a set of objects in the second scan zone based on the set of visual features; and
  in response to detecting the set of objects within a threshold distance of the second waypoint of the flight path, defining a sixth waypoint between the second waypoint and the third waypoint of the flight path; and
wherein accessing the set of images comprises accessing the set of images comprising the third sequence of images representing bases of the second set of trees and captured by the aerial vehicle proximal the sixth waypoint.

16. A method comprising:
accessing an overhead image depicting a stand of trees;
overlaying a boundary of the stand of trees onto the overhead image;
projecting an array of scan zones onto the overhead image within the boundary of the stand of trees;
deploying an aerial vehicle to execute a flight path through the array of scan zones;
during the flight path:
  traversing the aerial vehicle across the stand of trees to a first waypoint above a first scan zone;
  vertically traversing the aerial vehicle to a second waypoint proximal to a first floor of the first scan zone;
  laterally traversing the aerial vehicle from the first scan zone to a third waypoint proximal to a second floor of a second scan zone; and
  vertically traversing the aerial vehicle to a fourth waypoint above the second scan zone;

accessing a set of images captured by the aerial vehicle comprising:
  a first sequence of images representing tops of a first set of trees within the first scan zone;
  a first intermediate vertical sequence of images representing trunks of the first set of trees;
  a second sequence of images representing bases of the first set of trees within the first scan zone;
  a third sequence of images representing bases of a second set of trees within the second scan zone;
  a second intermediate vertical sequence of images representing trunks of the second set of trees; and
  a fourth sequence of images representing tops of the second set of trees within the second scan zone;
compiling the first sequence of images, the first intermediate vertical sequence of images, and the second sequence of images into a first three-dimensional representation of the first scan zone;
compiling the third sequence of images, the second intermediate vertical sequence of images, and the fourth sequence of images into a second three-dimensional representation of the second scan zone; and
assembling the first three-dimensional representation of the first scan zone and the second three-dimensional representation of the second scan zone into a third three-dimensional representation of the stand of trees.

17. The method of claim 16:
further comprising:
  interpolating a first set of tree canopy characteristics of a third set of trees between the first scan zone and the second scan zone based on visual features detected in the first sequence of images and the fourth sequence of images; and
  interpolating a first set of lower tree characteristics of the third set of trees between the first scan zone and the second scan zone based on visual features detected in the second sequence of images and the third sequence of images; and
wherein assembling the third three-dimensional representation of the stand of trees comprises compiling the first set of tree canopy characteristics and the first set of lower tree characteristics of the third set of trees into a virtual representation of tree characteristics across the stand of trees.

18. The method of claim 17, further comprising:
further comprising:
  extracting a second set of tree canopy characteristics of the first set of trees from the first sequence of images;
  extracting a third set of tree canopy characteristics from the fourth sequence of images;
  generating a tree characteristics model linking the first set of tree canopy characteristics, the second set of tree canopy characteristics, the third set of tree canopy characteristics, and the third three-dimensional representation of the stand of trees;
  isolating a first region of the overhead image representing a fourth set of trees excluded from the first scan zone and the second scan zone;
  extracting a set of tree characteristics of the fourth set of trees from the first region of the overhead image; and
  interpolating a fourth set of tree canopy characteristics of the fourth set of trees based on the tree characteristics model and the set of tree characteristics; and
wherein assembling the third three-dimensional representation of the stand of trees comprises compiling the first set of tree canopy characteristics, the second set of tree canopy characteristics, the third set of tree canopy characteristics, and the fourth set of tree canopy characteristics into the virtual representation of tree characteristics across the stand of trees.

19. A method comprising:
accessing a boundary of a stand of trees;
defining an array of scan zones within the boundary of the stand of trees;
defining a flight path comprising a set of waypoints representing positions within the array of scan zones;
accessing a set of images captured by the aerial vehicle comprising:
  a first sequence of images representing tops of a first set of trees within a first scan zone;
  a second sequence of images representing bases of the first set of trees within the first scan zone;
  a third sequence of images representing bases of a second set of trees within a second scan zone;
  a fourth sequence of images representing tops of the second set of trees; and
  a fifth sequence of images representing tops of a third set of trees within a third scan zone;
interpolating a first set of tree canopy characteristics of a fourth set of trees between the first scan zone and the second scan zone based on visual features detected in the first sequence of images and the fourth sequence of images;
interpolating a first set of lower tree characteristics of the fourth set of trees between the first scan zone and the second scan zone based on visual features detected in the second sequence of images and the third sequence of images;
interpolating a second set of tree canopy characteristics of a fifth set of trees between the second scan zone and the third scan zone based on visual features detected in the fourth sequence of images and the fifth sequence of images; and
compiling the first set of tree canopy characteristics, the first set of lower tree characteristics, and the second set of tree canopy characteristics into a virtual representation of tree characteristics across the stand of trees.

20. The method of claim 19, wherein defining the flight path comprising the set of waypoints representing positions within the array of scan zones comprises defining the flight path comprising:
  a first waypoint at a first altitude above the first set of trees within the first scan zone;
  a second waypoint at a second altitude proximal a first floor within the first scan zone;
  a third waypoint at the second altitude above a second floor within the second scan zone;
  a fourth waypoint at the first altitude above the second set of trees within the second scan zone; and
  a fifth waypoint at the first altitude above the third set of trees within the third scan zone.

* * * * *